(12) United States Patent
Akano

(10) Patent No.: US 7,710,546 B2
(45) Date of Patent: May 4, 2010

(54) LASER RECEIVER AND LASER RECEIVING SYSTEM

(75) Inventor: Hiroki Akano, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 995 days.

(21) Appl. No.: 11/068,951

(22) Filed: Mar. 2, 2005

(65) Prior Publication Data

US 2005/0167569 A1    Aug. 4, 2005

Related U.S. Application Data

(63) Continuation of application No. PCT/JP02/08876, filed on Sep. 2, 2002.

(51) Int. Cl.
*G01C 3/08* (2006.01)
(52) U.S. Cl. .................. 356/4.08; 356/3.01; 356/3.1; 356/4.01; 356/4.1
(58) Field of Classification Search ....... 356/3.01–3.15, 356/4.01–4.1, 5.01–5.15, 6–22
See application file for complete search history.

(56) References Cited

U.S. PATENT DOCUMENTS

| | | | | |
|---|---|---|---|---|
| 4,491,727 | A * | 1/1985 | Appelbaum et al. | 356/222 |
| 4,769,531 | A | 9/1988 | Malek | |
| 4,944,588 | A * | 7/1990 | Kohler | 356/141.5 |
| 5,010,244 | A * | 4/1991 | Nissborg | 250/206.1 |
| 5,440,116 | A * | 8/1995 | Bolander et al. | 250/216 |
| 5,914,661 | A * | 6/1999 | Gross | 340/600 |
| 6,476,943 | B1 * | 11/2002 | Yertoprakhov | 359/15 |

FOREIGN PATENT DOCUMENTS

| | | |
|---|---|---|
| EP | 0345320 | 12/1989 |
| JP | 61-191902 | 8/1986 |
| JP | 1-98915 | 4/1989 |
| JP | 2-115708 | 4/1990 |
| JP | 2-502854 | 9/1990 |
| JP | 3-99287 | 4/1991 |
| JP | 5-145489 | 6/1993 |

(Continued)

OTHER PUBLICATIONS

Notice of Reasons for Rejection dated Oct. 18, 2005.

*Primary Examiner*—Thomas H Tarcza
*Assistant Examiner*—Luke D Ratcliffe
(74) *Attorney, Agent, or Firm*—Staas & Halsey LLP

(57) ABSTRACT

In a laser receiver receiving a laser beam from a laser transmitter and a laser receiving system composed of a plurality of laser receivers, a plurality of photo devices are arranged on an acceptance surface so that acceptance angles of the laser beam thereof are mutually different in order to detect distances between an acceptance position of a center point of a received laser beam on an acceptance surface and a reference point and an elevation angle of the received laser beam from a reference surface. Also, distance detection means respectively compare acceptance levels of the photo devices detected by the level detection means with thresholds, thereby detecting distance between the center point of the laser beam and the reference point of the acceptance surface by combination of comparison results thereof. Elevation angle detection means respectively compare acceptance levels of the photo devices detected by the level detection means with thresholds, thereby detecting elevation angles from the reference surface by combination of comparison results thereof.

13 Claims, 31 Drawing Sheets

FOREIGN PATENT DOCUMENTS

| | | |
|---|---|---|
| JP | 7-253316 | 10/1995 |
| JP | 8-43198 | 2/1996 |
| JP | 2001-111090 | 4/2001 |
| SE | 459529 | 7/1989 |
| WO | WO 89/04972 | 6/1989 |

* cited by examiner

FIG.10

| | \[DISTANCE X [cm]\] | | | | | | | | | | \[ELEVATION ANGLE 90°\] |
|---|---|---|---|---|---|---|---|---|---|---|---|
| | 0 | 1 | 2 | 3 | 4 | 5 | 6 | 7 | 8 | 9 | 10 |
| SIGNAL 501 | PRESENCE | | | | | | ABSENCE | | | | |
| SIGNAL 502 | PRESENCE | | | | | | ABSENCE | | | | |
| SIGNAL 503 | PRESENCE | | | | | ABSENCE | | | | | |
| SIGNAL 504 | PRESENCE | | | | ABSENCE | | | | | | |
| SIGNAL 511 | | | | | | ABSENCE | | | | | |
| SIGNAL 512 | | | | | | ABSENCE | | | | | |
| SIGNAL 513 | | | | | | ABSENCE | | | | | |
| SIGNAL 514 | | ABSENCE | | PRESENCE | | | | ABSENCE | | | |
| SIGNAL 515 | ABSENCE | | | PRESENCE | | | | | ABSENCE | | |
| SIGNAL 516 | ABSENCE | | | PRESENCE | | | | | | ABSENCE | |
| SIGNAL 517 | ABSENCE | | | PRESENCE | | | | | | ABSENCE | |
| SIGNAL 518 | ABSENCE | | PRESENCE | | | | | | | ABSENCE | |
| SIGNAL 519 | ABSENCE | | PRESENCE | | | | | | | | |
| DETERMINATION RESULT OF DISTANCE BETWEEN CENTER POINTS [cm] | 0.0 – 0.5 | 0.5 – 1.0 | | 2.0 – 4.0 | | 4.0 – 5.0 | 5.0 – 5.5 | | | | |
| DETERMINATION RESULT OF ACCEPTANCE ELEVATION ANGLE [°] | 90 | | | UNDETERMINABLE | | | NO LIGHT ACCEPTANCE | | | NO LIGHT ACCEPTANCE | |

| | 0 | 1 | 2 | 3 | 4 | 5 | 6 | 7 | 8 | 9 | 10 | [ELEVATION ANGLE 67.5°] |
|---|---|---|---|---|---|---|---|---|---|---|---|---|
| SIGNAL 501 | PRESENCE | | | | | ABSENCE | | | | | | |
| SIGNAL 502 | | PRESENCE | | | | | ABSENCE | | | | | |
| SIGNAL 503 | | PRESENCE | | | | | ABSENCE | | | | | |
| SIGNAL 504 | | | | | | | ABSENCE | | | | | |
| SIGNAL 511 | ABSENCE | | PRESENCE | | | | | ABSENCE | | | | |
| SIGNAL 512 | | PRESENCE | | | | | | ABSENCE | | | | |
| SIGNAL 513 | | PRESENCE | | | | | | ABSENCE | | | | |
| SIGNAL 514 | | PRESENCE | | | | | | | ABSENCE | | | |
| SIGNAL 515 | | | PRESENCE | | | | | | ABSENCE | | | |
| SIGNAL 516 | | | PRESENCE | | | | | | ABSENCE | | | |
| SIGNAL 517 | | | PRESENCE | | | | | | | ABSENCE | | |
| SIGNAL 518 | | | | PRESENCE | | | | | | ABSENCE | | |
| SIGNAL 519 | | | | PRESENCE | | | | | | ABSENCE | | |
| DETERMINATION RESULT OF DISTANCE BETWEEN CENTER POINTS [cm] | 0.0 – 2.0 | | | 2.0 – 4.0 | | 5.5 – 6.0 | | | NO LIGHT ACCEPTANCE | | | |
| DETERMINATION RESULT OF ACCEPTANCE ELEVATION ANGLE [°] | 67.5 | | | UNDETERMINABLE | | | | | NO LIGHT ACCEPTANCE | | | |

| | 0 | 1 | 2 | 3 | 4 | 5 | 6 | 7 | 8 | 9 | 10 [ELEVATION ANGLE 45°] |
|---|---|---|---|---|---|---|---|---|---|---|---|
| SIGNAL 501 | PRESENCE | | | | | ABSENCE | | | | | |
| SIGNAL 502 | PRESENCE | | | | | | ABSENCE | | | | |
| SIGNAL 503 | PRESENCE | | | | | | | ABSENCE | | | |
| SIGNAL 504 | ABSENCE | | | | | | | | | | |
| SIGNAL 511 | | | PRESENCE | | | | | ABSENCE | | | |
| SIGNAL 512 | | PRESENCE | | | | | | | ABSENCE | | |
| SIGNAL 513 | | | PRESENCE | | | | | | ABSENCE | | |
| SIGNAL 514 | | | PRESENCE | | | | | | | ABSENCE | |
| SIGNAL 515 | | | PRESENCE | | | | | | | ABSENCE | |
| SIGNAL 516 | | | | PRESENCE | | | | | | ABSENCE | |
| SIGNAL 517 | | | | PRESENCE | | | | | | | ABSENCE |
| SIGNAL 518 | | | | PRESENCE | | | | | | | ABSENCE |
| SIGNAL 519 | | | | PRESENCE | | | | | | | ABSENCE |
| DETERMINATION RESULT OF DISTANCE BETWEEN CENTER POINTS [cm] | 0.0 – 2.0 | | | 2.0 – 4.0 | | 4.0 – 5.0 | 5.0 – 5.5 | 5.5 – 6.0 | | NO LIGHT ACCEPTANCE | |
| DETERMINATION RESULT OF ACCEPTANCE ELEVATION ANGLE [°] | 45 | | 0.0 – 22.5 | | | UNDETERMINABLE | | | | NO LIGHT ACCEPTANCE | |

FIG.13

| | 0 | 1 | 2 | 3 | 4 | 5 | 6 | 7 | 8 | 9 | 10 | [ELEVATION ANGLE 22.5°] |
|---|---|---|---|---|---|---|---|---|---|---|---|---|
| SIGNAL 501 | | | | | | ABSENCE | | | | | | |
| SIGNAL 502 | | | | | | ABSENCE | | | | | | |
| SIGNAL 503 | | | | | | ABSENCE | | | | | | |
| SIGNAL 504 | | | | | | ABSENCE | | | | | | |
| SIGNAL 511 | PRESENCE | | | | | | ABSENCE | | | | | |
| SIGNAL 512 | PRESENCE | | | | | | ABSENCE | | | | | |
| SIGNAL 513 | PRESENCE | | | | | | ABSENCE | | | | | |
| SIGNAL 514 | PRESENCE | | | | | | ABSENCE | | | | | |
| SIGNAL 515 | PRESENCE | | | | | | | ABSENCE | | | | |
| SIGNAL 516 | PRESENCE | | | | | | | ABSENCE | | | | |
| SIGNAL 517 | PRESENCE | | | | | | | ABSENCE | | | | |
| SIGNAL 518 | PRESENCE | | | | | | | | ABSENCE | | | |
| SIGNAL 519 | | PRESENCE | | | | | | | | NO LIGHT ACCEPTANCE | | |
| DETERMINATION RESULT OF DISTANCE BETWEEN CENTER POINTS [cm] | 2.0 — 4.0 | | | 4.0 — 5.0 | 5.0 — 5.5 | 5.5 — 6.0 | | | | | | |
| DETERMINATION RESULT OF ACCEPTANCE ELEVATION ANGLE [°] | 0.0 — 22.5 | | | UNDETERMINABLE | | | | | NO LIGHT ACCEPTANCE | | | |

FIG.14

| | DISTANCE X [cm] | | | | | | | | | | [ELEVATION ANGLE 0°] |
|---|---|---|---|---|---|---|---|---|---|---|---|
| | 0 | 1 | 2 | 3 | 4 | 5 | 6 | 7 | 8 | 9 | 10 |
| SIGNAL 501 | | | | | | ABSENCE | | | | | |
| SIGNAL 502 | | | | | | ABSENCE | | | | | |
| SIGNAL 503 | | | | | | ABSENCE | | | | | |
| SIGNAL 504 | | | | | | ABSENCE | | | | | |
| SIGNAL 511 | | | | | | PRESENCE | | | | | |
| SIGNAL 512 | | | | | | PRESENCE | | | | | |
| SIGNAL 513 | | | | | | PRESENCE | | | | | |
| SIGNAL 514 | | | | | | PRESENCE | | | | | |
| SIGNAL 515 | | | | | | PRESENCE | | | | | |
| SIGNAL 516 | | | | | | PRESENCE | | | | | |
| SIGNAL 517 | | | | | | PRESENCE | | | | | |
| SIGNAL 518 | | | | | | PRESENCE | | | | | |
| SIGNAL 519 | | | | | | PRESENCE | | | | | |
| DETERMINATION RESULT OF DISTANCE BETWEEN CENTER POINTS [cm] | | | | | | UNDETERMINABLE | | | | | |
| DETERMINATION RESULT OF ACCEPTANCE ELEVATION ANGLE [°] | 0 | | | | — | | | | | | 22.5 |

LASER RECEIVER AND LASER RECEIVING SYSTEM

This application is a continuing application, filed under 35 U.S.C. §111(a), of International Application PCT/JP02/08876, filed Sep. 2, 2002.

BACKGROUND OF THE INVENTION

1. Field of the Invention

The present invention relates to a laser receiver and a laser receiving system, and in particular to a laser receiver receiving a laser beam from a laser transmitter and a laser receiving system composed of a plurality of laser receivers.

2. Description of the Related Art

Some conventional laser receivers have a single photo device (photoreceptor device or receiving optics) while others have a plurality of photo devices. Any of the laser receivers has the photo devices arranged therein so that a directivity and an acceptance sensitivity suitable for the purposes of the systems may be achieved in consideration of the directivities of the photo devices.

FIG. 29 shows directivity of a general photo device. When a photo device 10 is arranged on an acceptance surface L as shown in FIG. 29, the acceptance sensitivity in a vertical direction (zenithal direction) with respect to the acceptance surface L is maximum and the acceptance sensitivity decreases as an angle (elevation angle) is lowered from the zenith. As shown in FIG. 29, when the acceptance sensitivity in the zenithal direction is supposed to be 100%, the acceptance sensitivity near a horizontal direction to the acceptance surface L assumes the order of 30%.

Thus, general photo devices have the maximum acceptance sensitivity in the zenithal direction with respect to the acceptance surface, the acceptance sensitivity thereof decreasing as the angle is lowered from the zenith.

FIGS. 30A and 30B show an example of a single photo device arranged on a conventional laser receiver. FIG. 30A is a plan view of a laser receiver 20, and FIG. 30B is a side view thereof. The laser receiver 20 shown in FIGS. 30A and 30B has a photo device 21 with a large acceptance area arranged on the acceptance surface L. The acceptance sensitivity of this laser receiver 20 is directly affected by the directivity of the photo device 21, so that the acceptance sensitivity is maximum in the zenithal direction, decreasing as the angle is lowered from the zenith. Therefore, it has not been possible to accept a laser beam from the horizontal direction with respect to the acceptance surface L.

FIG. 31 is a circuit arrangement of the laser receiver 20 shown in FIGS. 30A and 30B. As shown in FIG. 31, the laser receiver 20 is composed of the photo device 21, a level detection circuit 30 and a controller 33. The level detection circuit 30 has an amplifier 31 for amplifying a signal accepted (received) by the photo device 21, and comparators 32_H and 32_L for comparing the signal amplified by the amplifier 31 with reference voltages VH and VL, respectively.

It is supposed that there is a relationship of VH>VL between the reference voltages VH and VL. Therefore, the comparator 32_H detects a signal of a higher reference voltage. The outputs of the comparators 32_H and 32_L are provided to the controller 33 as signals 301 and 302, respectively.

Thus, the level detection circuit 30 has been able to shape the signal received by the photo device 21 and obtain information indicating a level at which the laser beam is received by using the comparators 32_H and 32_L.

Thus, the laser receiver having a single photo device has been able to detect a level of the laser beam received. However, even if the center of the laser beam hits a position off the laser receiver, it has not been able to detect how off the center of the laser beam hits the laser receiver. Also, it has not been able to detect an acceptance angle at which the laser beam is received.

On the other hand, as an example of a laser receiver having a plurality of photo devices, Japanese examined patent application publication No. 7-26808 discloses a method of detecting an acceptance position of a pulse laser light by arranging numerous photo devices all over the acceptance surface.

By this method, it is made possible to detect the acceptance position of the laser beam within the area where the photo devices are arranged. However, since it is required to arrange numerous photo devices to the entire area where the acceptance position is to be detected, a massive number of photo devices are required for the detection of the acceptance position of the laser beam within a large area.

Also, it has not been able to detect an acceptance angle at which the laser beam is received by this method.

In a communication system performing data transmission/reception by using a laser beam, it is usually required to perform an optical axis adjustment between a laser transmitter and a laser receiver before starting the data transmission/reception.

It is ideal that the center of the laser beam from the laser transmitter hits the center of the laser receiver vertically. Therefore, if the laser receiver can detect the distance between the center of the received laser beam and the center of the laser receiver as well as the acceptance angle, it is made possible to perform an optical axis adjustment by using the results thereof.

Also, the laser receiver can be used as a target for determining whether a laser beam as a dummy bullet hits or misses in e.g. a simulant target training system.

In this case, if the acceptance position of the center point of the received laser beam on the acceptance surface is detected by using the conventional laser receiver, it is required to arrange numerous laser receivers in order to cover the surface of the target object in case the target is a large object such as a human body. Also in case of the laser receiver having a plurality of photo devices, it is required to arrange a massive number of photo devices in order to cover the surface of the target object, so that it is unrealistic.

SUMMARY OF THE INVENTION

It is accordingly an object of the present invention to provide a laser receiver receiving a laser beam from a laser transmitter and a laser receiving system composed of a plurality of laser receivers which detect a distance between an acceptance position of a center point of a received laser beam on an acceptance surface and a reference point, and an elevation angle of the received laser beam from the acceptance surface.

Also, it is another object of the present invention to obtain a detection result corresponding to a material of the acceptance surface.

Also, it is another object of the present invention to provide a laser receiving system capable of detecting the acceptance position of the center point of the received laser beam on the acceptance surface without arranging numerous photo devices all over the acceptance surface.

Moreover, it is another object of the present invention to enable such a laser receiver and a laser receiving system to be used as a target in e.g. simulant target training.

[1] In order to achieve the above-mentioned object, the laser receiver according to the present invention comprises: a plurality of photo devices arranged on an acceptance surface so that acceptance angles of the laser beam thereof are mutually different; and level detection means detecting acceptance levels of the laser beam for the respective photo devices.

Namely, in the present invention, a plurality of photo devices are arranged on an acceptance surface of a laser receiver so that acceptance angles of the laser beam thereof are mutually different. Level detection means detect acceptance levels of the received laser beam for the respective photo devices.

Since the photo devices have a directivity for a laser beam acceptance angle, i.e. acceptance sensitivity, the acceptance levels of the photo devices detected by the level detection means assume mutually different values by arranging a plurality of photo devices so that the acceptance angles thereof are mutually different.

Therefore, by using the above-mentioned acceptance levels of the photo devices, it is made possible to detect the distance between the acceptance position of the center point of the received laser beam on the acceptance surface and the reference point such as a center point of the laser receiver, as well as an elevation angle of the received laser beam from a reference surface such as the acceptance surface.

[2] Also, the laser receiver according to the present invention may further comprise distance detection means respectively comparing the acceptance levels of the photo devices detected by the level detection means with thresholds, and detecting a distance between a center point of the laser beam and a reference point on the acceptance surface by a combination of comparison results.

Namely, distance detection means respectively compare the acceptance levels of the photo devices detected by the above-mentioned level detection means with thresholds, and detect the distance between the center point of the laser beam and a reference point on the acceptance surface by a combination of comparison results.

[3] The thresholds in the above-mentioned invention [2] may be settable to values corresponding to a beam pattern transmitted by the laser transmitter.

Namely, by preliminarily measuring or simulating relationships between the distance between the center point of the laser beam and the reference point, and the acceptance levels of the photo devices, the thresholds are set to values corresponding to a beam pattern transmitted by the above-mentioned laser transmitter based on the results thereof.

Thus, it is made possible to detect the distance between the acceptance position of the center point of the received laser beam on the acceptance surface and the reference point.

[4] Also, the laser receiver according to the present invention may further comprise elevation angle detection means respectively comparing the acceptance levels of the photo devices detected by the level detection means with thresholds, and detecting an elevation angle from a reference surface by a combination of comparison results.

Namely, elevation angle detection means respectively compare the acceptance levels of the photo devices detected by the above-mentioned level detection means with thresholds, and detect an elevation angle from a reference surface by a combination of comparison results.

[5] The thresholds in the above-mentioned invention [4] may be settable to values corresponding to a beam pattern transmitted by the laser transmitter.

Namely, by preliminarily measuring or simulating the relationships between the elevation angle of the laser beam and the acceptance levels of the photo devices, the thresholds are set to values corresponding to the beam patterns transmitted by the above-mentioned laser transmitter.

Thus, it is made possible to detect the elevation angle of the received laser beam from the reference surface.

[6] The distance detection means in the above-mentioned invention [2] may be capable of changing the combination of the comparison results corresponding to a material of the acceptance surface.

Namely, since reflection characteristics of the laser beam depend on the material of the acceptance surface, the distance detection means change the combination of the comparison results according to the material of the acceptance surface by preliminarily obtaining appropriate combinations of the comparison results for the materials of the acceptance surface by measurement.

Thus, it is made possible to obtain a detection result of the distance between the center point of the laser beam and the reference point corresponding to the material of the acceptance surface. Therefore, it is made possible to reduce a determination error due to the material.

[7] The elevation angle detection means in the above-mentioned invention [4] may be capable of changing the combination of the comparison results corresponding to a material of the acceptance surface.

Namely, since reflection characteristics of the laser beam depend on the material of the acceptance surface, the elevation angle detection means change the combination of the comparison results according to the material of the acceptance surface by preliminarily obtaining appropriate combinations of the comparison results for the materials of the acceptance surface by measurement.

Thus, it is made possible to obtain a detection result of the elevation angle corresponding to the material of the acceptance surface. Therefore, it is made possible to reduce a determination error due to the material.

[8] Also, a laser receiving system according to the present invention has a plurality of the laser receivers according to the above-mentioned invention [1] placed on a common acceptance surface and comprises: distance detection means respectively comparing the acceptance levels of the photo devices detected by the level detection means of the laser receivers with thresholds, and detecting distances between a center point of the laser beam and reference points corresponding to the laser receivers on the acceptance surface by a combination of comparison results; and acceptance position detection means detecting an acceptance position of the laser beam respectively based on coordinates of the reference points and the distances.

Namely, acceptance position detection means detect an acceptance position of the laser beam respectively based on coordinates of the reference points and the above-mentioned distances.

Therefore, since the photo devices need not be actually positioned at the acceptance position of the center point of the laser beam, there is no need to arrange numerous photo devices all over the acceptance surface as in the conventional technology, so that it is made possible to detect the acceptance position of the central point of the received laser beam as an area on the acceptance surface.

[9] Also, determination means comparing the distance detected by the distance detection means with a predetermined threshold, and determining whether or not the laser beam simulant of a bullet hits within a predetermined area may be provided in the above-mentioned invention [2].

Such a laser receiver can be used in e.g. simulant target training as a target where a hit/miss of a dummy bullet can be determined or with being attached to a target such as a car or a human body.

[10] Also, area determination means determining which area on the acceptance surface is hit by the laser beam simulant of a bullet, based on the acceptance position of the laser beam detected by the acceptance position detection means may be provided in the above-mentioned invention [8].

Such a laser receiving system can be used in e.g. a simulant target training as a target where a hit position of a dummy bullet can be determined as an area or with being attached to a target.

[11] Also, a laser receiving system according to the present invention has a plurality of the laser receivers according to the above-mentioned invention [1] placed thereon and may further comprise: elevation angle detection means respectively comparing the acceptance levels of the photo devices detected by the level detection means of the laser receivers with thresholds, and detecting an elevation angle from a reference surface by a combination of comparison results; and determination means determining a direction from which the laser beam simulant of a bullet has been transmitted based on the elevation angle from the reference surface detected by the elevation angel detection means.

Such a laser receiving system can be used in e.g. a simulant target training as a target where a hit direction of a dummy bullet can be determined or with being attached to a target such as a car or a human body.

[12] Also, a laser receiving system according to the present invention has a plurality of the laser receivers according to the above-mentioned invention [4] placed thereon and may further comprise: determination means determining a direction from which the laser beam simulant of a bullet has been transmitted based on the elevation angles from the reference surface detected by the elevation angel detection means of the respective laser receivers.

Such a laser receiving system can be used in e.g. a simulant target training as a target where a hit direction of the dummy bullet can be determined or with being attached to a target such as a car or a human body.

[13] In the above-mentioned invention [1], at least one of the photo devices may be arranged so that an acceptance sensitivity thereof for the laser beam transmitted from a vertical direction with respect to the acceptance surface becomes maximum, and the other photo devices may be arranged so that acceptance sensitivities thereof for the laser beam transmitted from a horizontal direction with respect to the acceptance surface become maximum.

Namely, at least one of the photo devices (first photo device) is arranged so that an acceptance sensitivity thereof for the laser beam transmitted from a vertical direction with respect to the acceptance surface becomes maximum, while the other photo devices (second photo devices) are arranged so that acceptance sensitivities thereof for the laser beam transmitted from a horizontal direction with respect to the acceptance surface become maximum. Therefore, when a laser beam is received from an elevation angle which minimizes the acceptance sensitivity of either one of the first and the second photo devices, the acceptance sensitivity of the other photo device is maximized.

Therefore, the first and second photo devices complement each other, so to speak, with respect to mutual acceptance levels. Also, the difference of the acceptance levels between the first and the second photo devices is outstanding especially for the laser beam transmitted from the vertical direction with respect to the acceptance surface, so that the above-mentioned distance between the center point of the laser beam and the reference point and the elevation angle with respect to the reference surface can be detected at a relatively high precision.

BRIEF DESCRIPTION OF THE DRAWINGS

The above and other objects and advantages of the invention will be apparent upon consideration of the following detailed description, taken in conjunction with the accompanying drawings, in which the reference numerals refer to like parts throughout and in which:

FIG. 10 is a diagram showing determination results, at the elevation angle of 90°, of a distance between center points of laser receiver and laser beam and an acceptance elevation angle in an embodiment (1);

FIG. 11 is a diagram showing determination results, at the elevation angle of 67.5°, of a distance between center points of laser receiver and laser beam and an acceptance elevation angle in an embodiment (1);

FIG. 12 is a diagram showing determination results, at the elevation angle of 45°, of a distance between center points of laser receiver and laser beam and an acceptance elevation angle in an embodiment (1);

FIG. 13 is a diagram showing determination results, at the elevation angle of 22.5°, of a distance between center points of laser receiver and laser beam and an acceptance elevation angle in an embodiment (1);

FIG. 14 is a diagram showing determination results, at the elevation angle of 0°, of a distance between center points of laser receiver and laser beam and an acceptance elevation angle in an embodiment (1);

DESCRIPTION OF THE EMBODIMENTS

Embodiment (1)

Embodiment of Laser Receiver

Figure 1A:
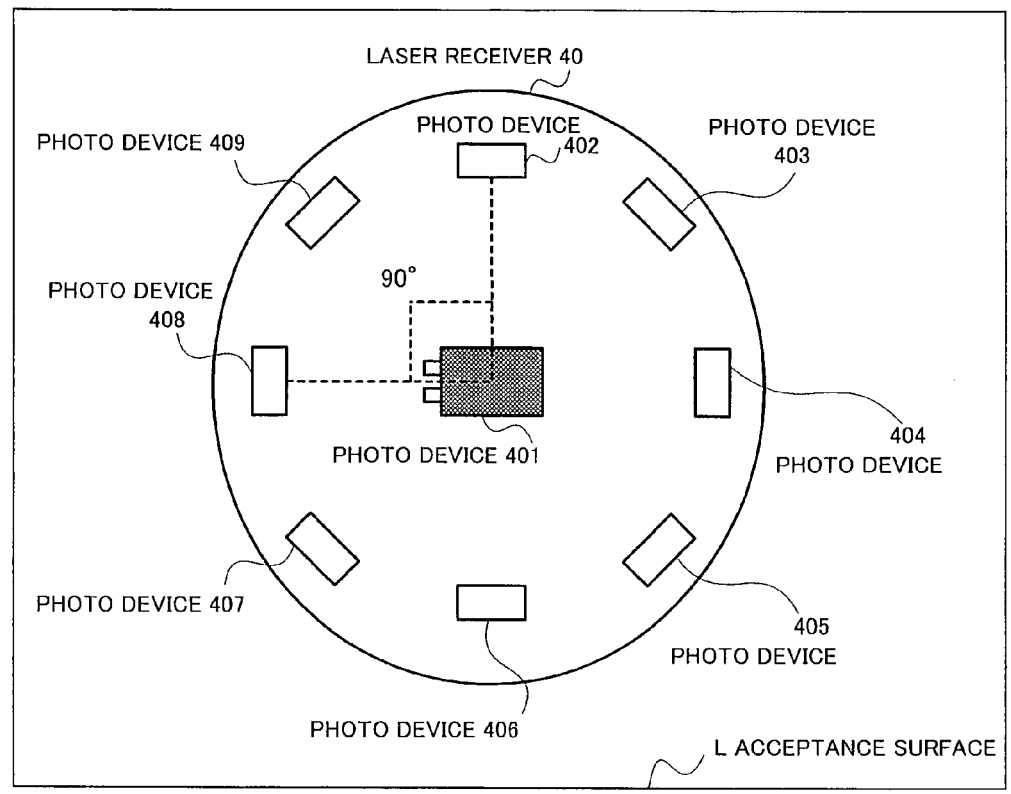
FIGS. 1A and 1B are block diagrams showing an arrangement of photo devices in an embodiment (1) of a laser receiver according to the present invention.
Figure 1B:
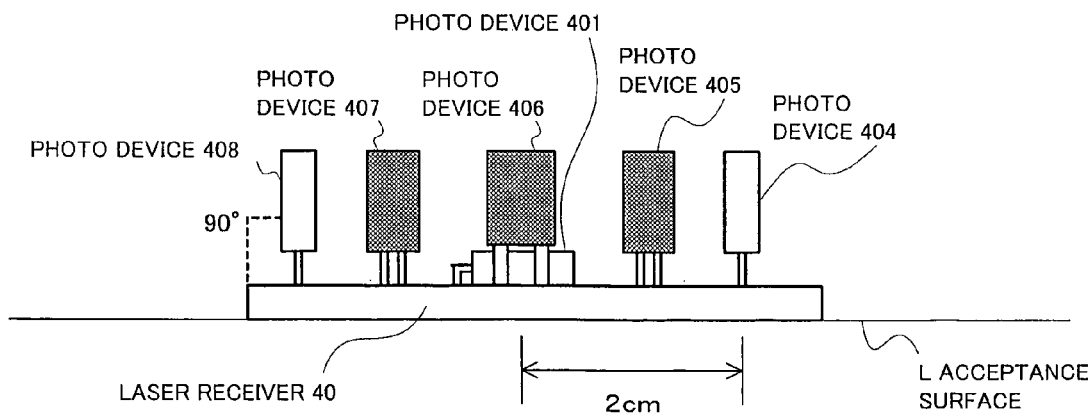

FIGS. 1A and 1B show an arrangement example of photo devices in an embodiment of a laser receiver according to the present invention, respectively as a plan view and a side view of a laser receiver 40.

As shown in FIGS. 1A and 1B, a photo device 401 is arranged at a center of a laser receiver 40 so that acceptance sensitivity thereof is made maximum for the vertical (zenithal) direction with respect to an acceptance surface L. Also, photo devices 402-409 are arranged so that the acceptance sensitivities thereof may be made maximum for the horizontal direction with respect to the acceptance surface L facing 8 directions on the circumference of a circle whose radius is 2 cm from the center of the photo device 401 and shifted by 45°. In this case, the intervals between the photo device 401 and the photo devices 402-409 are respectively approximately 2 cm.

Figure 2:
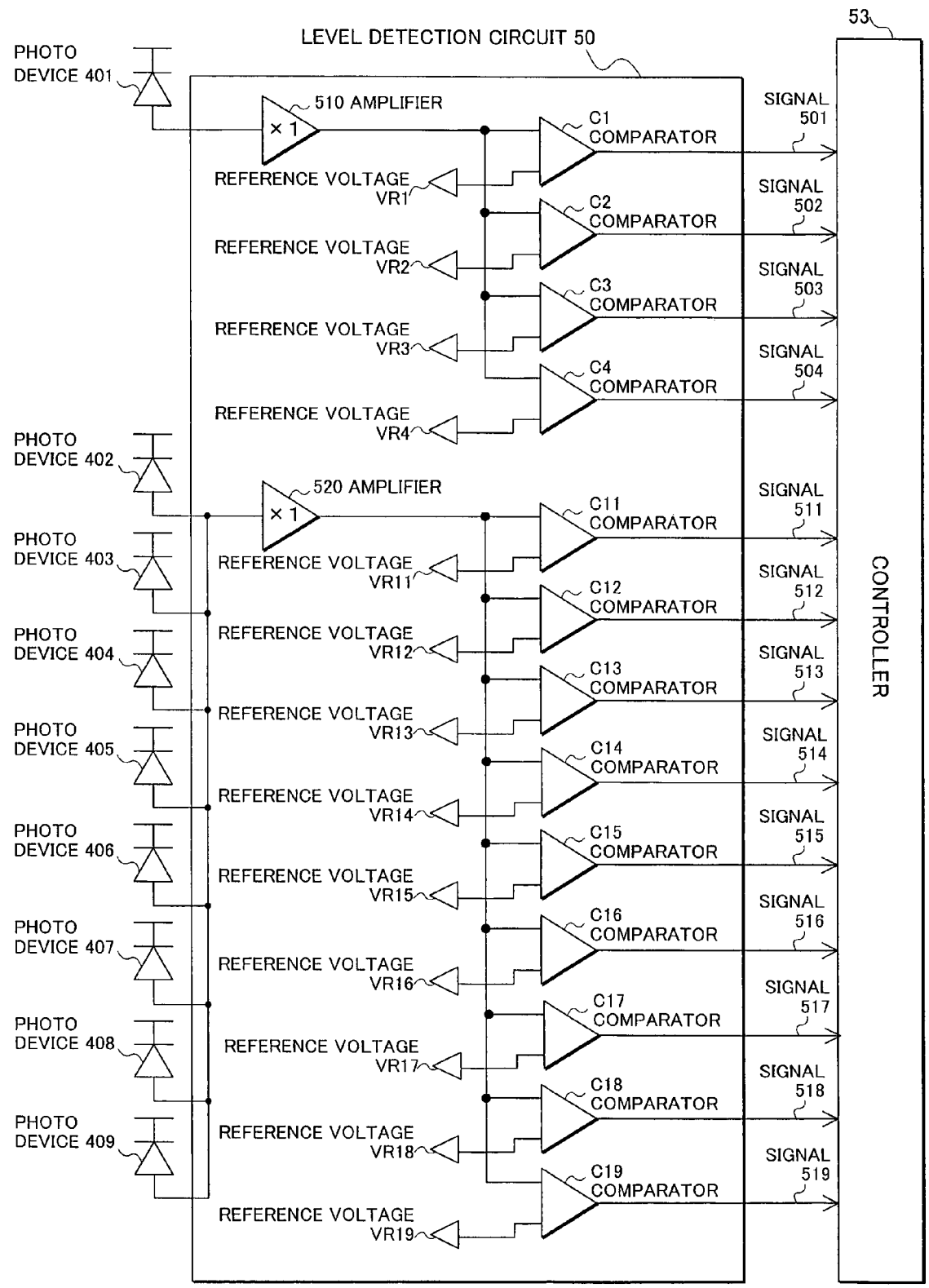
FIG. 2 is a block diagram showing an arrangement of an embodiment (1) of a laser receiver according to the present invention.

FIG. 2 shows an arrangement of the laser receiver 40 composed of the photo devices 401-409 shown in FIGS. 1A and 1B, a level detection circuit 50 and a controller 53.

Among these, the level detection circuit 50 is composed of a buffer amplifier (hereinafter, simply referred to as amplifier) 510 for amplifying an electric output signal from the photo device 401 by 1× magnification, an amplifier 520 for amplifying electric output signals from the photo devices 402-409 by 1× magnification, comparators C1, C2, C3 and C4 for respectively comparing an output signal of the amplifier 510 with reference voltages VR1, VR2, VR3 and VR4 to perform a magnitude determination (large or small) thereof, and comparators C11-C19 for respectively comparing an output signal of the amplifier 520 with reference voltages VR11-VR19 to perform a magnitude determination.

It is to be noted that while the amplifiers 510 and 520 used in this embodiment have amplification of 1× magnification, ones having appropriate magnification according to the level of the laser beam used (outputs level on the transmission side) may be used.

The controller 53 receives output signals 501-504 and 511-519 from the comparators C1-C4 and C11-C19 to perform detecting operations as will be described later.

It is to be noted that the reference voltages VR1-VR4 are preset to have a relationship of VR1>VR2>VR3>VR4, and the reference voltages VR11-VR19 are preset to have a relationship of VR11>VR12>VR13>VR14>VR15>VR16>VR17>VR18>VR19.

It is to be noted that orientations of the above-mentioned photo devices 401-409 may be changed depending on the characteristics of the laser beam received. Also, the intervals between the photo device 401 and the photo devices 402-409 (approximately 2 cm in this embodiment) may be changed by the beam pattern of the laser beam received. Moreover, the number of the comparators used and the reference voltages may be changed according to a desired precision of detection.

Figure 3:
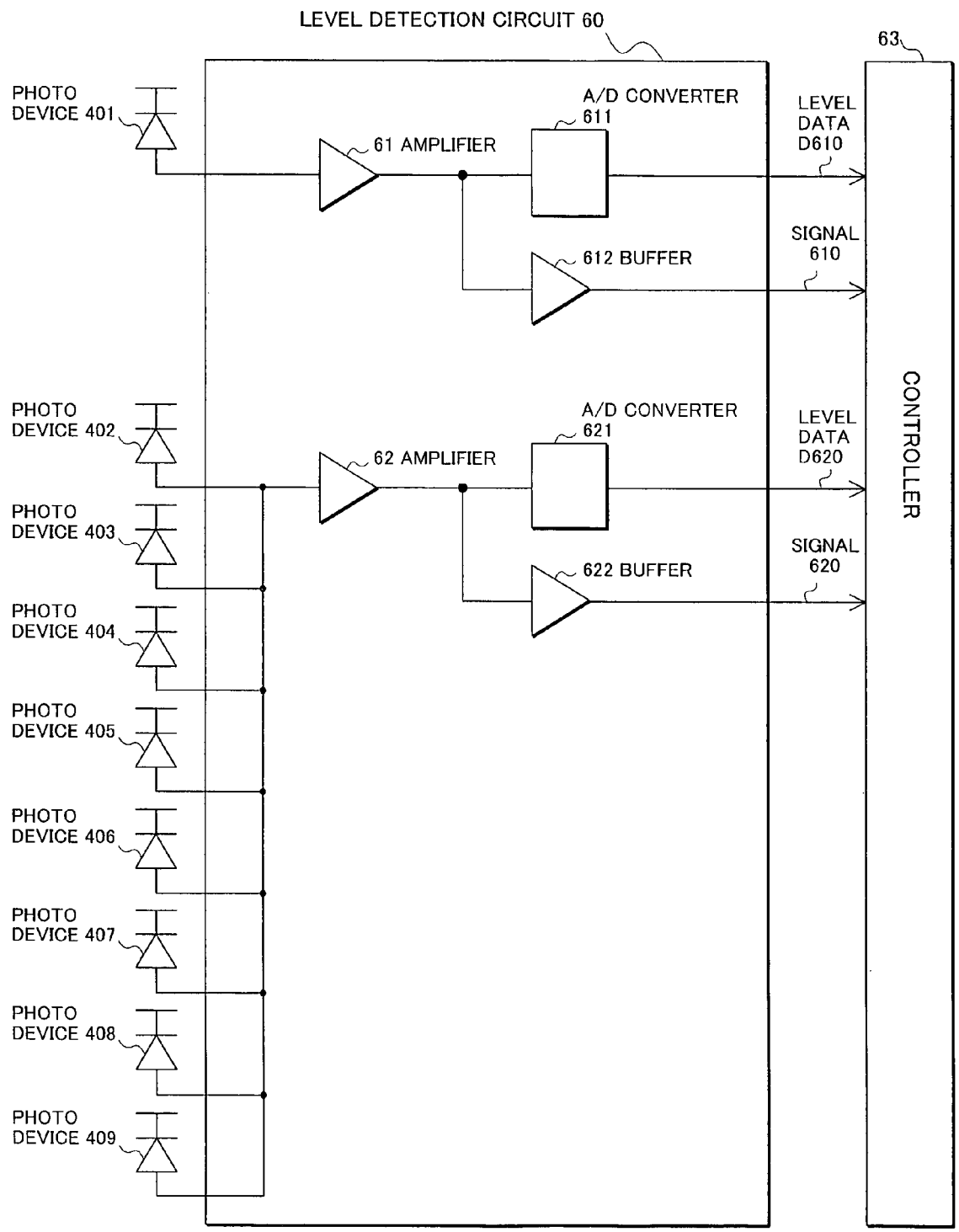
FIG. 3 is a modification of a block diagram showing another arrangement of an embodiment (1) of a laser receiver according to the present invention.

FIG. 3 shows another arrangement of the laser receiver 40 composed of the photo devices 401-409 shown in FIGS. 1A and 1B, a level detection circuit 60 and a controller 63.

Among these, the level detection circuit 60 is composed, in the same way as the above-mentioned level detection circuit 50, of an amplifier 61 for amplifying an electric output signal from the photo device 401 by 1× magnification, an amplifier 62 for amplifying electric output signals from the photo devices 402-409 by 1× magnification, A/D converter 611 for A/D converting a peak voltage of the amplifier 61 to be outputted as level data D610, a buffer 612 for shaping an output signal of the amplifier 61 to output data contents thereof as a signal 610 at a timing of the level data D610, an A/D converter 621 for A/D converting a peak voltage of the amplifier 62 to be outputted as level data D620, and a buffer 622 for shaping an output signal of the amplifier 62 to output data contents thereof as a signal 620 at a timing of the level data D620.

The controller 63 inputs the level data D610 and D620 respectively outputted from the A/D converters 611 and 621 as well as the signals 610 and 620 outputted from the buffers 612 and 622 to perform detecting operations as will be described later.

It is to be noted that the signals 610 and 620 include contents of the data included in the received laser beam.

Reference Voltages and Determination Criteria Setting

It is supposed that unless otherwise stated, the laser receivers used in the following description are those having the arrangement shown in FIG. 2. In order to perform various kinds of detection using such a laser receiver 40, it is firstly required to set appropriate reference voltages and determination criteria. Accordingly, measurements described hereinafter are preliminarily performed.

Figure 4:
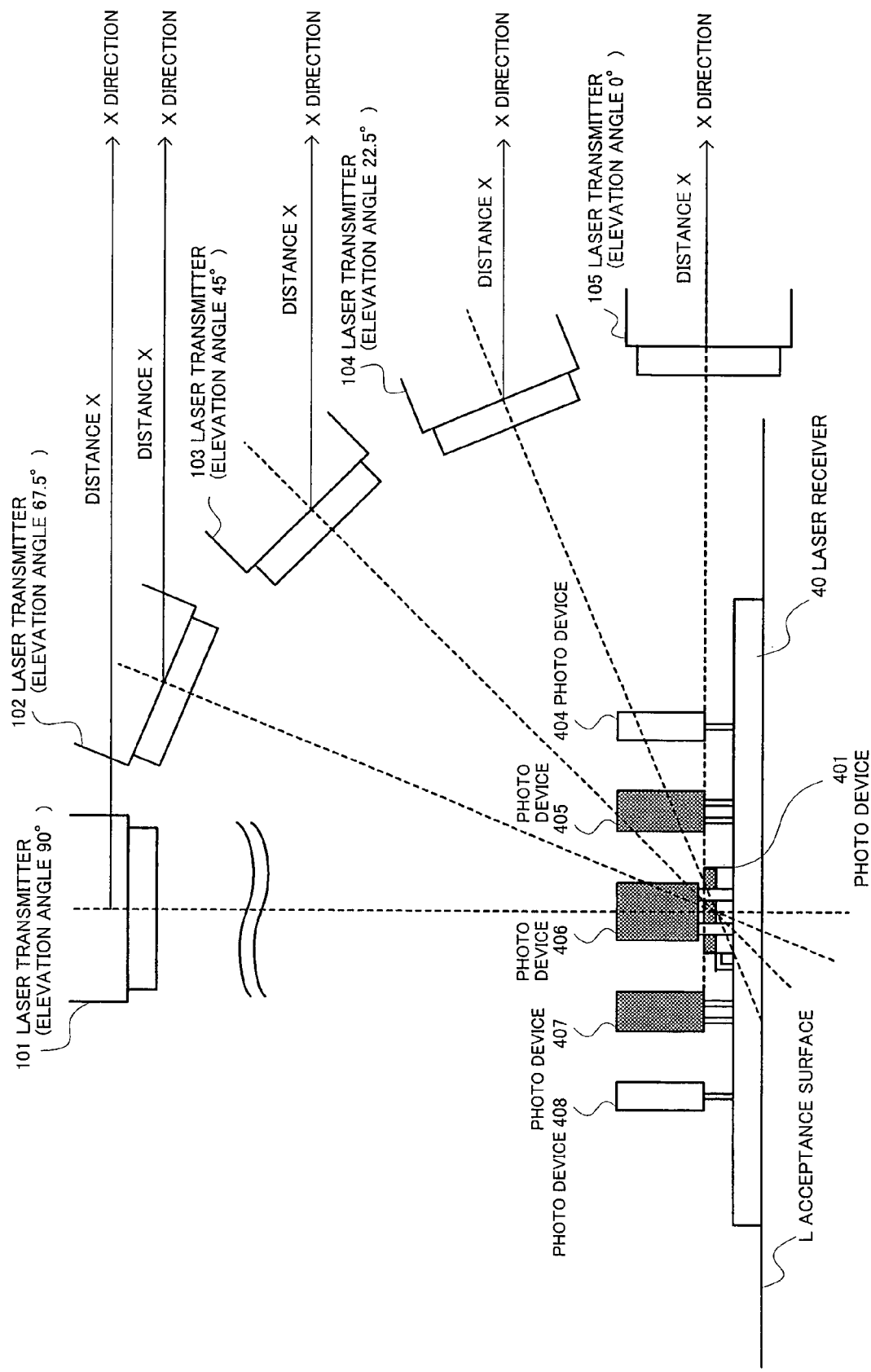
FIG. 4 is a diagram illustrating forms of laser beam acceptance in an embodiment (1) of a laser receiver according to the present invention.

FIG. 4 shows forms of accepting laser beam in such measurements. Namely, a laser beam is firstly provided in a zenithal direction (at elevation angle of 90°) from a laser transmitter 101 to the laser receiver 40. At this time, the measurement is started at a position where the laser beam outputted from the laser transmitter 101 hits the center of the laser receiver 40 and measurements are performed at predetermined intervals (e.g. 1 cm) while moving the laser transmitter 101 in parallel in a direction of "X".

Figure 5:
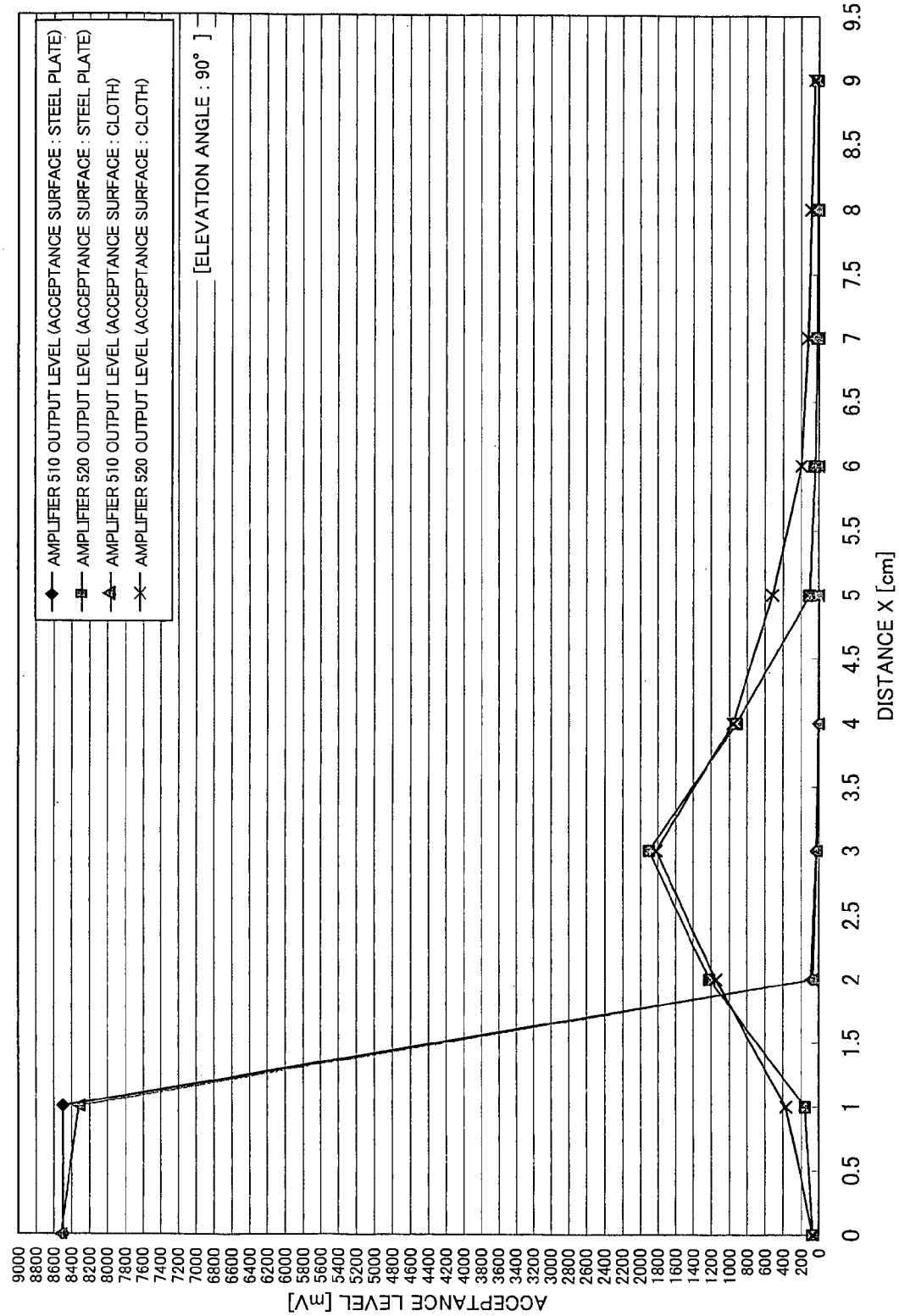
FIG. 5 is a graph showing a relationship between a distance X and an acceptance level in case the elevation angle shown in FIG. 4 is 90°.

FIG. 5 shows a graph indicating a relationship between a distance "X" and the acceptance level of the laser receiver 40 at this time. Namely, output levels of the amplifiers 510 and 520 are plotted every 1 cm of distance in FIG. 5. It is to be noted that the output levels of the amplifiers 510 and 520 in cases where the acceptance surface is a steel plate and a cloth are respectively shown by marks "♦", "■", "▲" and "x".

Figure 6:
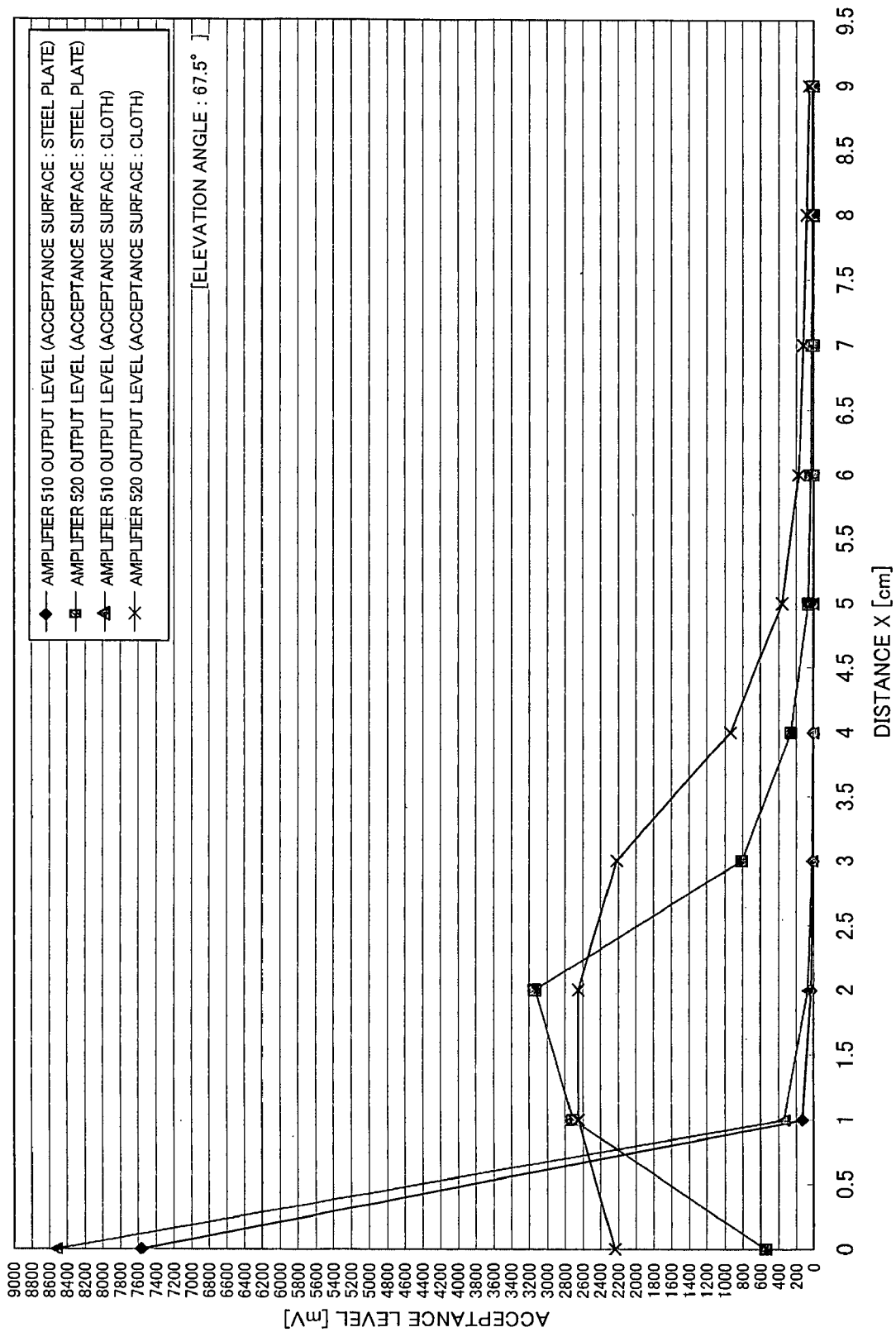
FIG. 6 is a graph showing a relationship between a distance X and an acceptance level in case the elevation angle shown in FIG. 4 is 67.5°.
Figure 7:
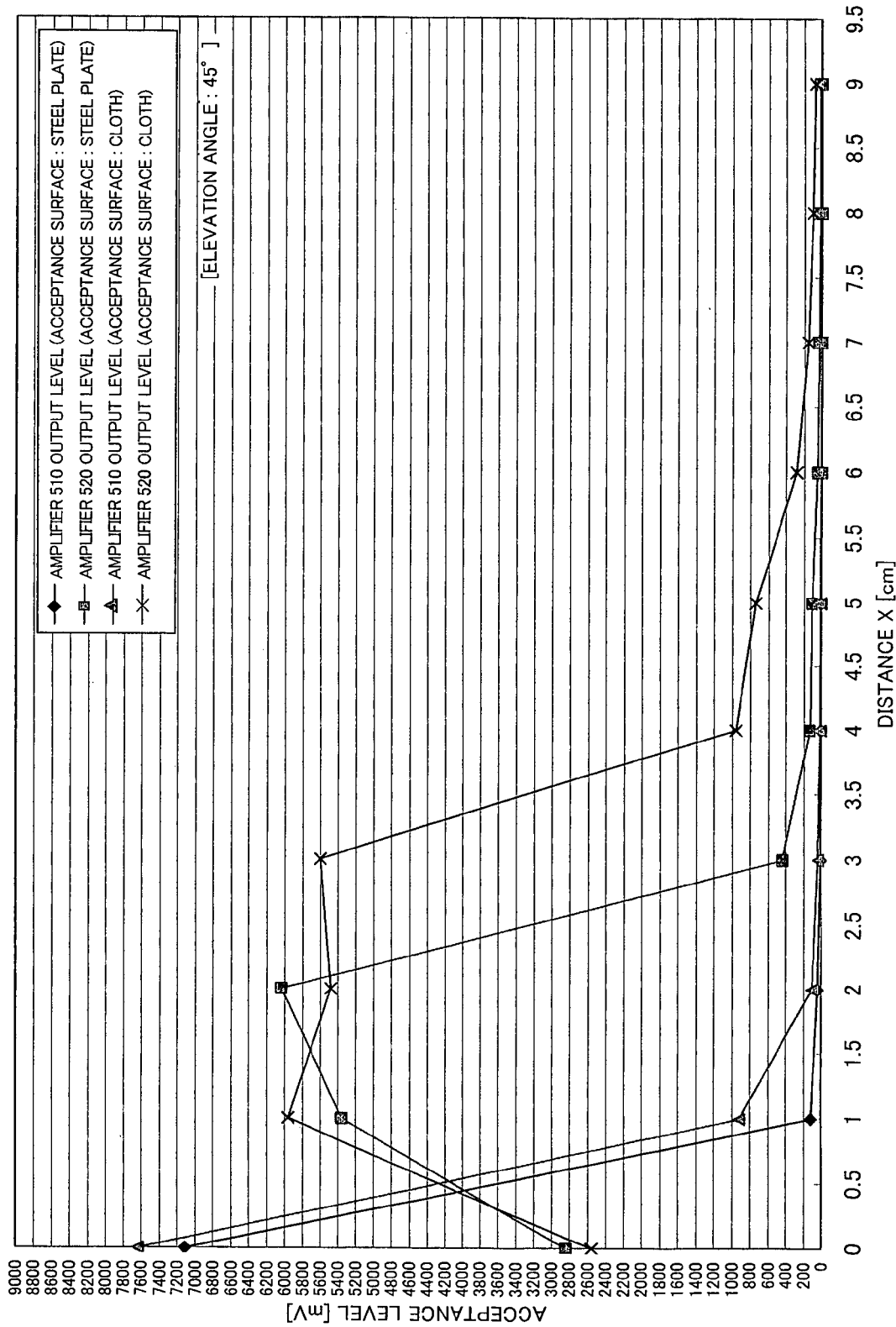
FIG. 7 is a graph showing a relationship between a distance X and an acceptance level in case the elevation angle shown in FIG. 4 is 45°.
Figure 8:
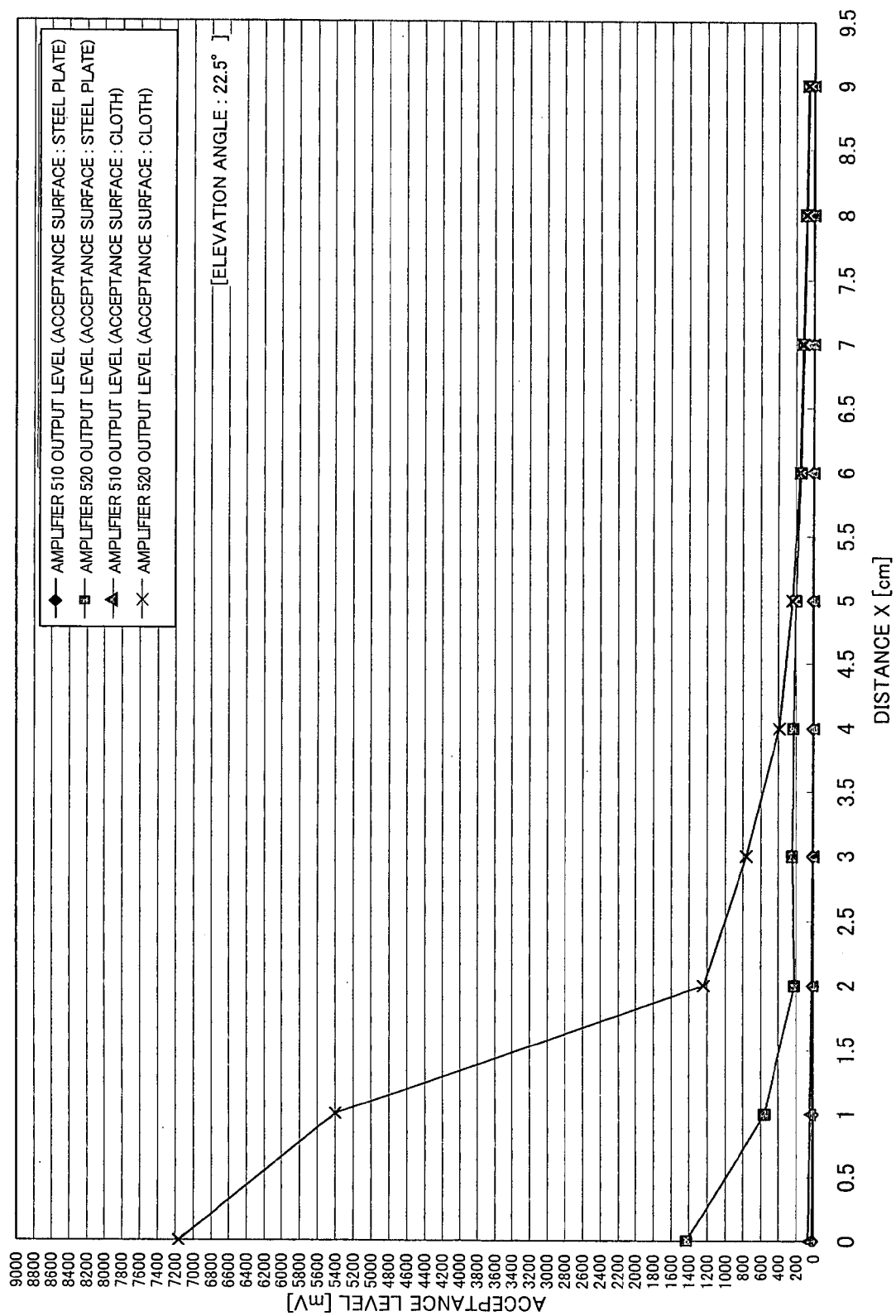
FIG. 8 is a graph showing a relationship between a distance X and an acceptance level in case the elevation angle shown in FIG. 4 is 22.5°.
Figure 9:
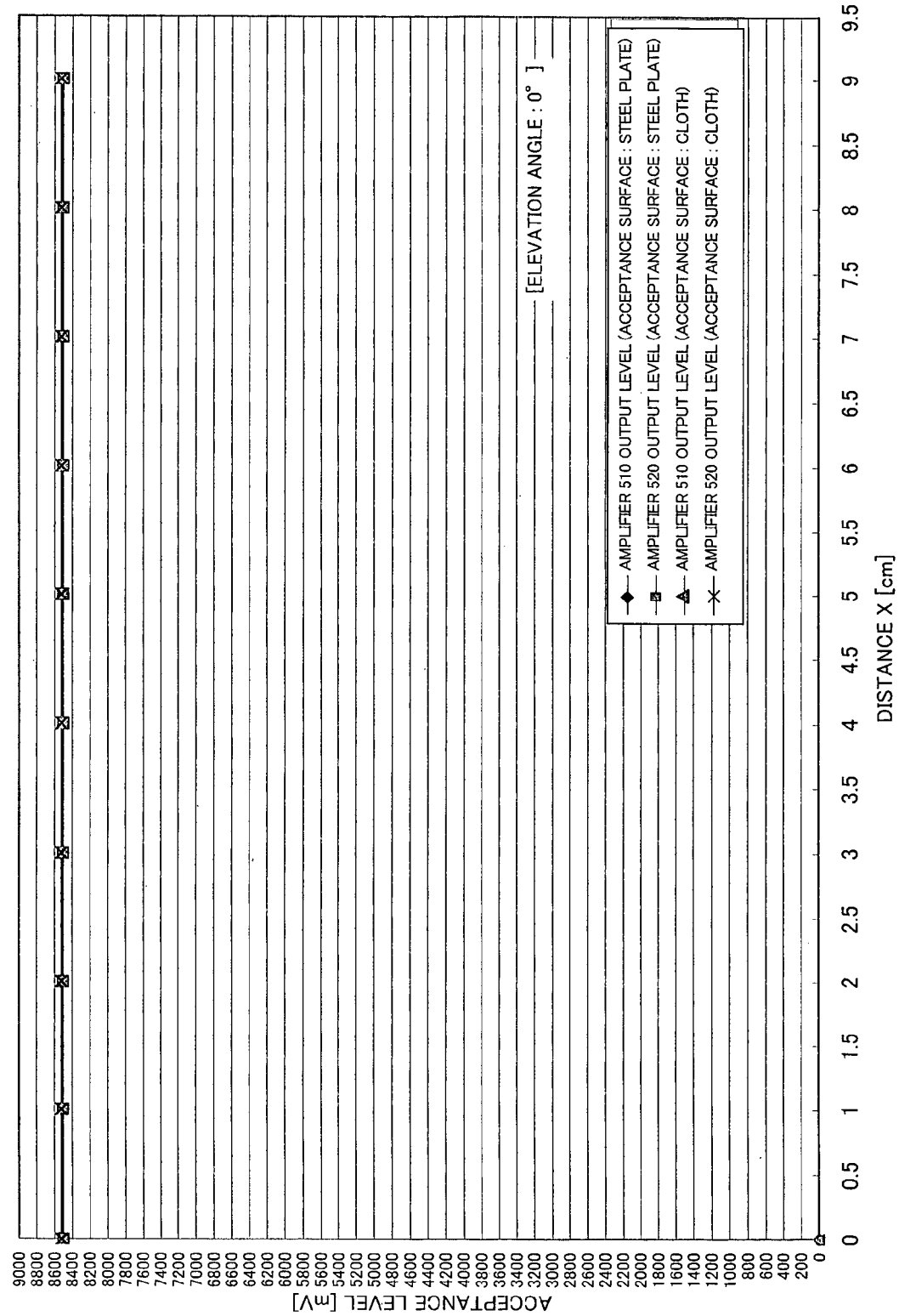
FIG. 9 is a graph showing a relationship between a distance X and an acceptance level in case the elevation angle shown in FIG. 4 is 0°.

It is to be noted that different materials for the acceptance surface are used for the measurements since the reflection characteristic of the laser beam is affected by the material of the acceptance surface. As shown in FIGS. 5 and 9, no outstanding difference between the measurement results at elevation angles of 90° and 0° due to the difference of the materials of the acceptance surface is found. However as shown in FIGS. 6-8, at elevation angles of 67.5°, 45° and 22.5°, the difference of the measurement results due to the material of the acceptance surface for the output level of especially the amplifier 520 is found.

Subsequently, measurements are performed for the case where the laser beam is applied with the elevation angle of 67.5° to the laser receiver as shown in FIG. 4 with respect to the laser transmitter 102. In the same way as the above-mentioned case of the laser transmitter 101, the measurement is started at a position where the laser beam hits the center of the laser receiver 40, and the measurements are performed at predetermined intervals (e.g. 1 cm) while moving the laser transmitter 102 in the "X" direction in parallel. A graph indicating the measurement result is shown in FIG. 6.

Moreover, as for the elevation angles 45°, 22.5° and 0°, respective laser transmitters 103, 104, and 105 are used to start the measurements at positions where the laser beam hits the center of the laser receiver 40 and the measurements are performed at predetermined intervals (e.g. 1 cm) while moving the laser transmitters 103-105 in parallel in the "X" direction. Thus, measurement results as respectively shown in FIGS. 7, 8 and 9 are obtained.

Based on the above-mentioned measurement results of FIGS. 5-9, the reference voltages VR1-VR4 and VR11-VR19 of the level detection circuit 50 shown in FIG. 2 are respectively set to 7800 mV, 6200 mV, 4600 mV, 3000 mV, 3200 mV, 2400 mV, 2000 mV, 1600 mV, 1200 mV, 800 mV, 600 mV, 400 mV and 200 mV.

This is a setting of the reference voltages supposing that the acceptance surface is a cloth.

Also, FIGS. 10-14 show states of presence or absence of the signals 501-504 and 511-519 for the distance "X" when the laser beams of elevation angles 90°, 67.5°, 45°, 22.5° and 0° are respectively received in case the reference voltages VR1-VR4 and VR11-VR19 are set as mentioned above.

Among these, the states of presence or absence of the signals 501-504 are determined by whether or not the output level of the amplifier 510 exceeds the reference voltages VR1-VR4, respectively. Therefore, when the elevation angle is 90°, for example, by paying attention to the output level (when the acceptance surface is a cloth) of the amplifier 510 indicated by e.g. the mark "▲" in FIG. 5, it is found that e.g. the signal 501 is present (H level) when the distance "X" is within the range of 0 cm-ca. 1.2 cm. Similarly, by paying attention to the output level of the amplifier 520 indicated by the mark "x" in FIG. 5, it is found that e.g. the signal 514 is present (H level) when the distance "X" is within the range of ca. 2.7 cm-ca. 3.3 cm.

Thus, FIG. 10 shows the states of presence or absence of the signals 501-504 and 511-519 for the distance "X" in case the elevation angle is 90° obtained from FIG. 5. Similarly, FIGS. 11-14 respectively show the states of presence or absence of the signals 501-504 and 511-519 for the distance "X" when the elevation angles are 67.5°, 45°, 22.5° and 0°, respectively obtained from FIGS. 6-9.

Hereinafter, processings for preparing determination criteria of the distance between the center point of the laser beam on the acceptance surface and the reference point and for detecting the distance and the acceptance elevation angle based on the determination criteria will be described.

In the following description, it is supposed that the center point of the laser receiver 40 shown in FIG. 1A, namely the center point of the photo device 401 is used as an example of the reference point, and that the distance between the center point of the laser beam and the reference point is referred to as the distance between center points.

Also, the reference surface L shown in FIG. 1A is used as an example of the reference surface. However, the present invention is not limited to both of the reference point and the reference surface.

Figure 15:
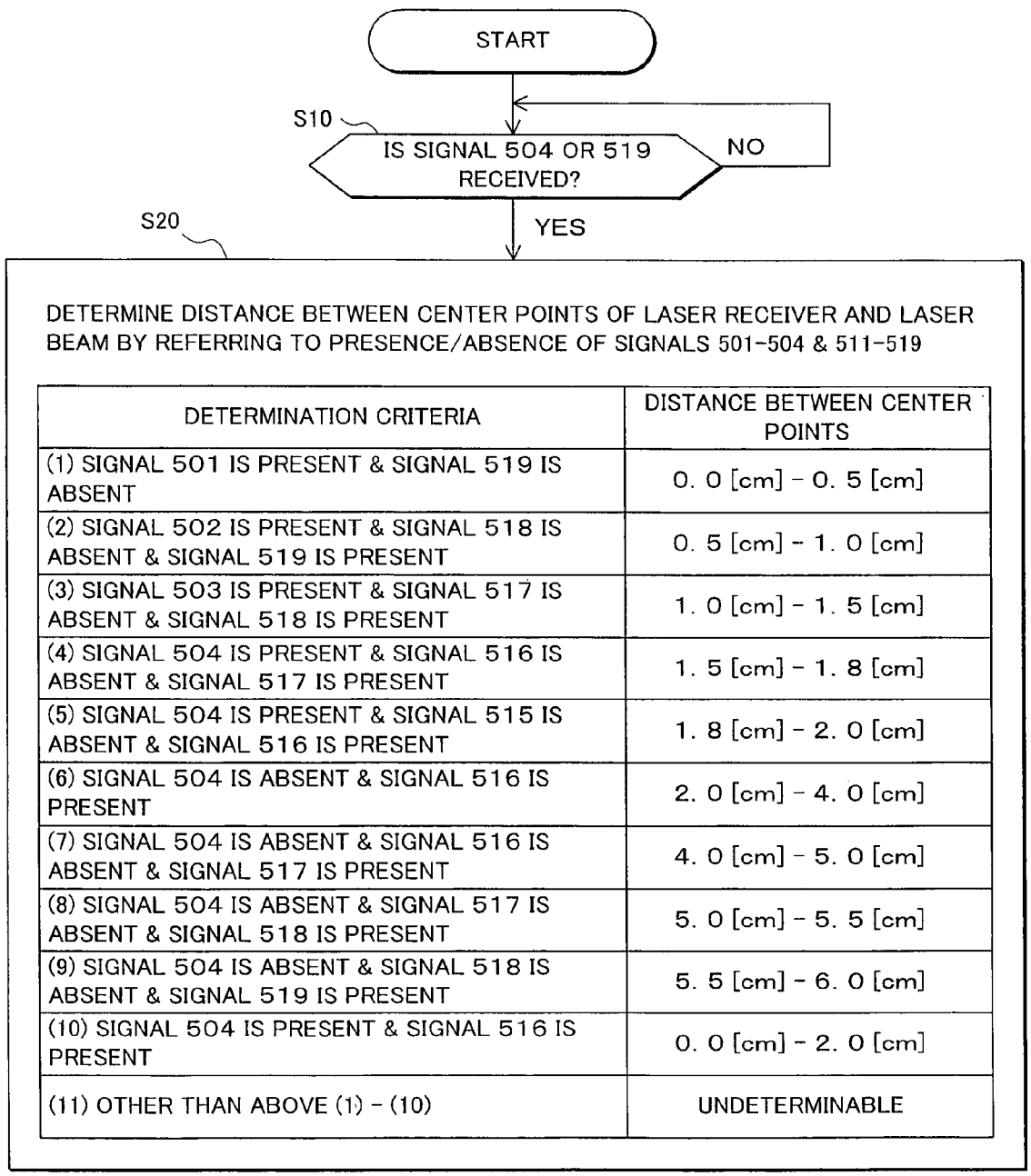
FIG. 15 is a flow chart showing an operation example of detecting distance between center points by a controller used for a laser receiver according to the present invention.

Detection Example of Distance Between Center Points: FIG. 15

By analyzing the states of presence or absence of the signals 501-504 and 511-519 for the distance "X" shown in FIGS. 10-14 and preparing determination criteria in which a combination of the signals 501-504 and 511-519 characterizing a certain distance between center points is associated with the distance between center points, the following criteria are obtained for example:

(1) When the signal 501 is present and the signal 519 is absent, it is determined that the distance between center points is 0.0 cm-0.5 cm.

(2) When the signal 502 is present, the signal 518 is absent and the signal 519 is present, it is determined that the distance between center points is 0.5 cm-1.0 cm.

(3) When the signal 503 is present, the signal 517 is absent and the signal 518 is present, it is determined that the distance between center points is 1.0 cm-1.5 cm.

(4) When the signal 504 is present, the signal 516 is absent and the signal 517 is present, it is determined that the distance between center points is 1.5 cm-1.8 cm.

(5) When the signal 504 is present, the signal 515 is absent and the signal 516 is present, it is determined that the distance between center points is 1.8 cm-2.0 cm.

(6) When the signal 504 is absent and the signal 516 is present, it is determined that the distance between center points is 2.0 cm-4.0 cm.

(7) When the signal 504 is absent, the signal 516 is absent and the signal 517 is present, it is determined that the distance between center points is 4.0 cm-5.0 cm.

(8) When the signal 504 is absent, the signal 517 is absent and the signal 518 is present, it is determined that the distance between center points is 5.0 cm-5.5 cm.

(9) When the signal 504 is absent, the signal 518 is absent and the signal 519 is present, it is determined that the distance between center points is 5.5 cm-6.0 cm.

(10) When the signal 504 is present and the signal 516 is present, it is determined that the distance between center points 0.0 cm-2.0 cm.

(11) In cases other than the above (1)-(10), the distance between center points is undeterminable.

While the above-mentioned determination criteria (1)-(11) of the distance between center points are shown as an example prepared based on FIGS. 10-14, the determination criteria are not limited to the above-mentioned (1)-(11). It is possible to prepare determination criteria for obtaining a more detailed determination result for the distance between center points of 2.0 cm-4.0 cm, for example.

Also, when the reference voltages VR1-VR4 and VR11-VR19 are changed, the states of absence or presence of the signals 501-504 and 511-519 for the distance "X" differ from those of FIGS. 10-14. Therefore, it is required to prepare other determination criteria.

Hereinafter, a processing flow of a controller 53 for detecting the distance between center points by using the above-mentioned determination criteria (1)-(11) will be described referring to FIG. 15.

Firstly, the controller 53 determines whether or not the signal 504 or 519 is received (at step S10).

If the signal 504 or 519 is not received at the above-mentioned step S10, it can be determined that it is a state where none of the signals can be received, namely, a state where the laser beam is not received. Therefore, step S10 is repeated until the signal 504 or 519 is received.

When the signal 504 or 519 is received at step S10, the distance between center points for the center point of the laser receiver and the center point of the laser beam is detected by using the above-mentioned determination criteria (1)-(11) for the determination at step S20.

The determination results of the distance between center points at step S20 correspond to the determination results shown at the bottom of FIGS. 10-14.

Although the distance between center points is undeterminable in case the elevation angle is 0° as shown at the bottom of FIG. 14, it is shown by FIGS. 10-13 that determination results of the distance between center points can be obtained within the range of 0.0 cm-6.0 cm. Specifically, in FIG. 10 showing the case of the elevation angle of 90°, it is found that more subdivided determination results such as 0.0 cm-0.5 cm, 0.5 cm-1.0 cm, 1.0 cm-1.5 cm, 1.5 cm-1.8 cm and 1.8 cm-2.0 cm for the distance between center points equal to or less than 2 cm can be obtained.

These determination criteria depend on the beam pattern of the laser beam received. For example, if the beam pattern has a level gradually changing (attenuating) outwardly from the center of the laser beam, it is made possible to determine the distance between center points within a broader range by preparing determination criteria according to the pattern.

Figure 16:
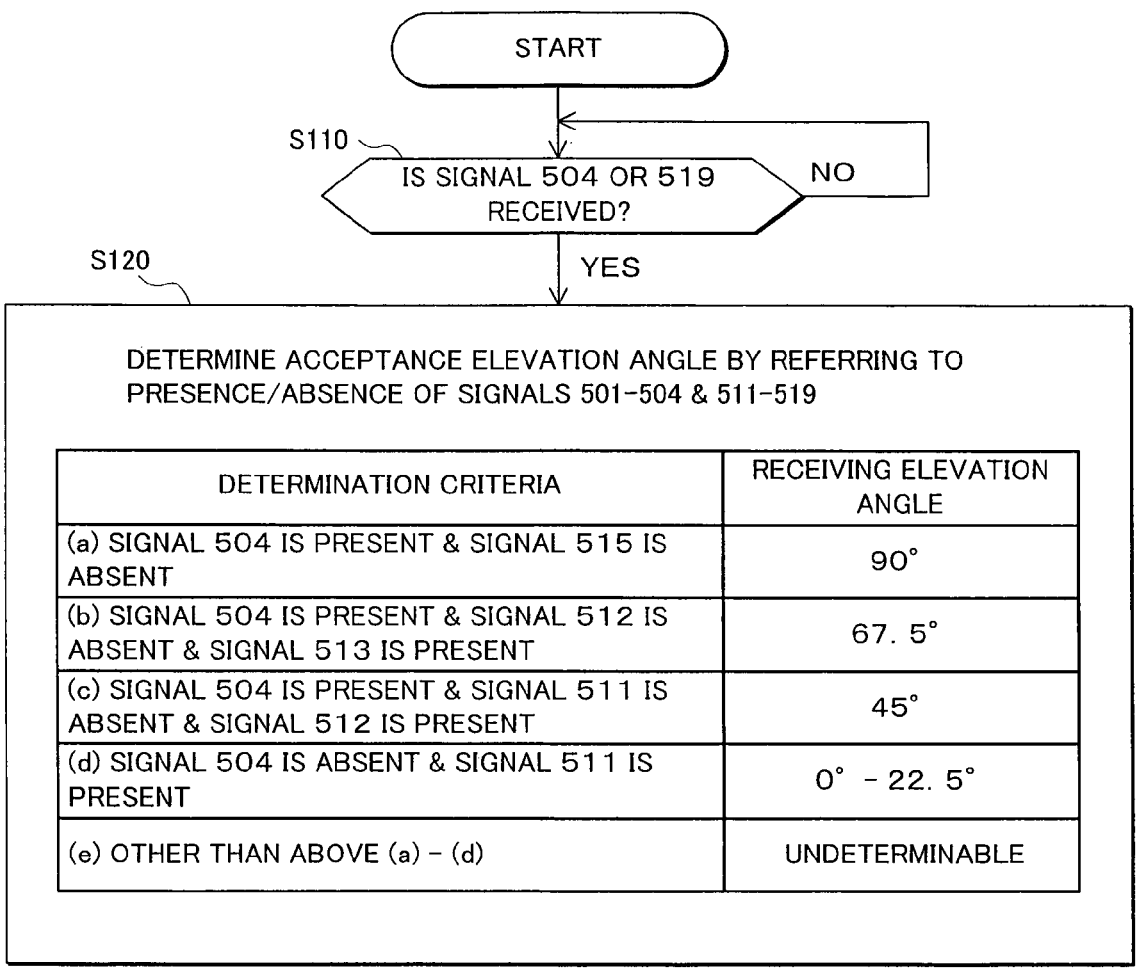
FIG. 16 is a flow chart showing an operation example of determining an acceptance elevation angle by a controller used for a laser receiver according to the present invention.

Detection of Acceptance Elevation Angle: FIG. 16

In the same way as the case of preparing the determination criteria of the above-mentioned distance between center points, by analyzing the states of absence or presence of the signals 501-504 and 511-519 for the distance "X" shown in FIGS. 10-14 and preparing determination criteria in which combinations of the signals 501-504 and 511-519 characterizing respective acceptance elevation angles 90°, 67.5°, 45°, 22.5° and 0° associated with the acceptance elevation angles, the following criteria are obtained for example:

(a) When the signal 504 is present and the signal 515 is absent, it is determined that the acceptance elevation angle is 90°.

(b) When the signal 504 is present, the signal 512 is absent and the signal 513 is present, it is determined that the acceptance elevation angle is 67.5°.

(c) When the signal 504 is present, the signal 511 is absent and the signal 512 is present, it is determined that the acceptance elevation angle is 45°.

(d) When the signal 504 is absent, and the signal 511 is present, it is determined that the acceptance elevation angle is 0°-22.5°.

(e) In cases other than the above (a)-(d), the elevation angle is undeterminable.

Hereinafter, a processing flow of detecting the acceptance elevation angle at the controller 53 by using the above-mentioned determination criteria (a)-(e) will be described referring to FIG. 16.

Firstly, the controller 53 determines whether or not the signal 504 or 519 is received (at step S110).

In the same way as the step S10 in FIG. 15, if the signal 504 or 519 is not received at the above-mentioned step S110, it can be determined that it is a state where none of the signals can be received, namely, a state where the laser beam is not received, so that step S110 is repeated until signal 504 or 519 is received.

When the signal 504 or 519 is received at step S110, the acceptance elevation angle is detected at step S120 by using the above-mentioned determination criteria (a)-(e) for the acceptance elevation angle.

The determination results of the acceptance elevation angle at step S120 are shown at the bottom of each of FIGS. 10-14.

It is to be noted that while specific values such as 90°, 67.5°, and 45° are indicated as the acceptance elevation angles in the above-mentioned determination criteria (a)-(c), these determination results are not exact values but indicate that the respective elevation angles are ca. 90°, ca. 67.5° and ca. 45°.

Also, as apparent from FIGS. 10-13, relatively accurate determination results of the acceptance elevation angle can be obtained when the distance between center points is near 0 cm.

It is to be noted that in the above description of detecting the difference between center points and the acceptance elevation angle, the determination criteria are prepared based on FIGS. 5-9 for a case where the acceptance surface is a cloth. However, it is possible to set determination criteria for the case where the acceptance surface is a steel plate based on e.g. the data for the acceptance surface of the steel plate shown in FIGS. 5-9.

Also, by registering a plurality of materials such as cloth, steel and plastic as material information for the acceptance surface, and by performing the above-mentioned detection by using the determination criteria based on measurements obtained for the materials, it is made possible to improve the detection accuracy according to the material of the acceptance surface.

Embodiment (2)

Embodiment of Laser Receiving System

An embodiment of a laser receiving system having a plurality of the laser receivers described in the above-mentioned embodiment (1) will now be described.

Figure 17:
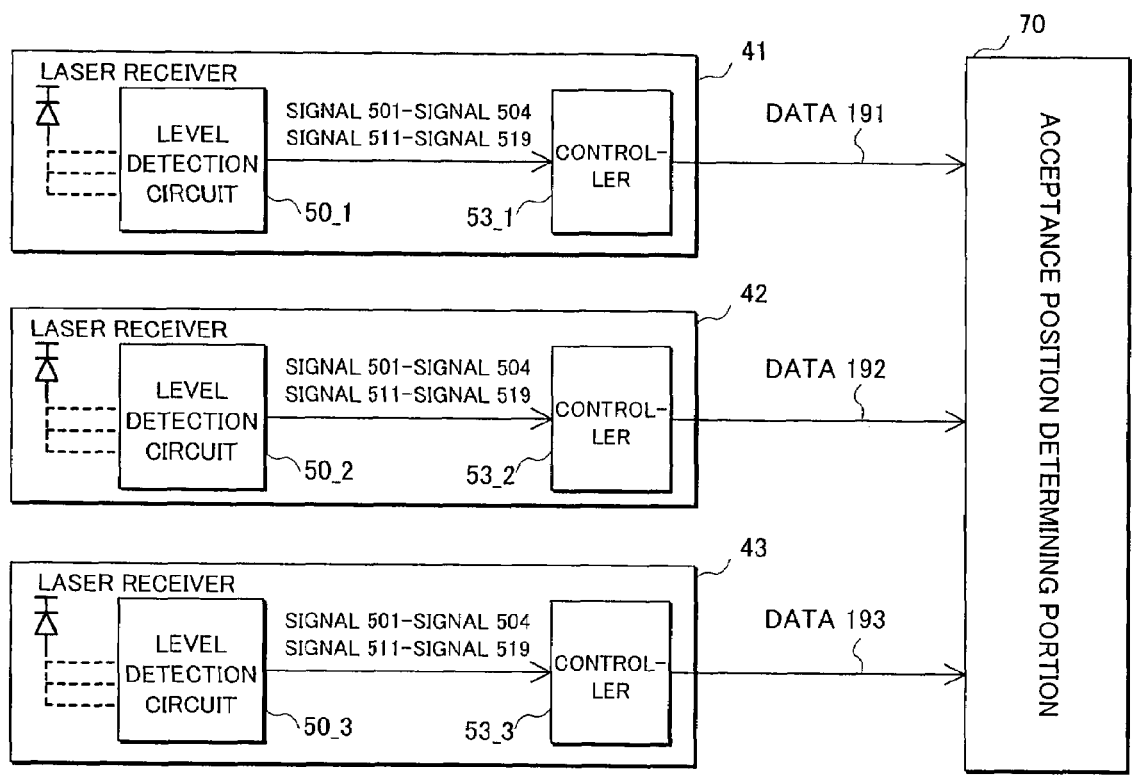
FIG. 17 is a functional block diagram showing an embodiment (2) of a laser receiving system according to the present invention.

FIG. 17 shows a laser receiving system composed of laser receivers 41-43 having a similar arrangement as that of the laser receiver 40 shown in FIGS. 1A, 1B and 2, and an acceptance position determining portion 70. It is to be noted that the laser receivers 41-43 have level detection circuits 50_1-50_3 and controllers 53_1-53_3 corresponding to the level detection circuit 50 and the controller 53 of the laser receiver 40, respectively, and output data 191-193 from the controllers 53_1-53_3 are inputted to the acceptance position determining portion 70.

Figure 18:
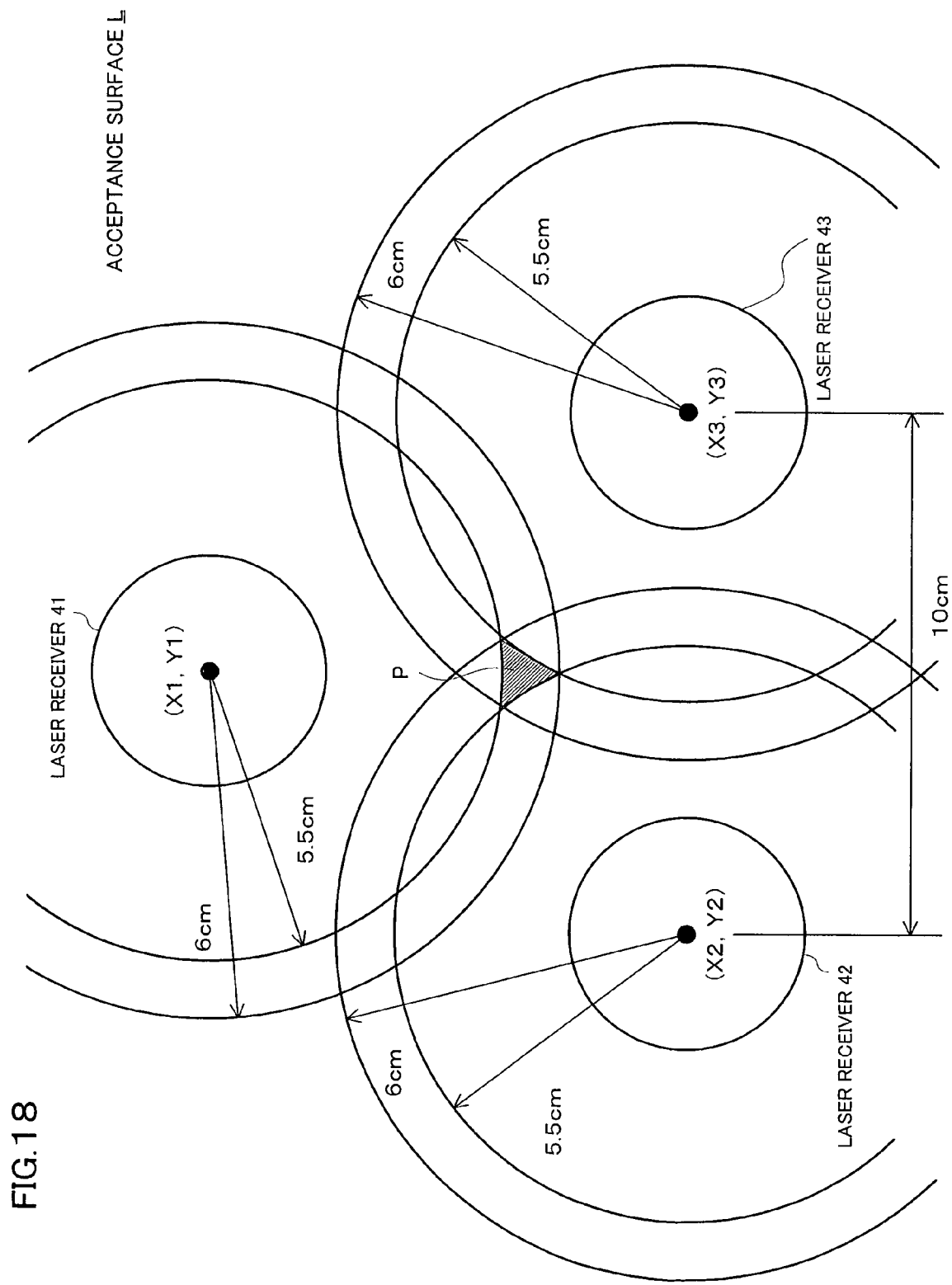
FIG. 18 is a diagram illustrating a determination example of an acceptance position determined by using a laser receiving system according to the present invention.
Figure 19:
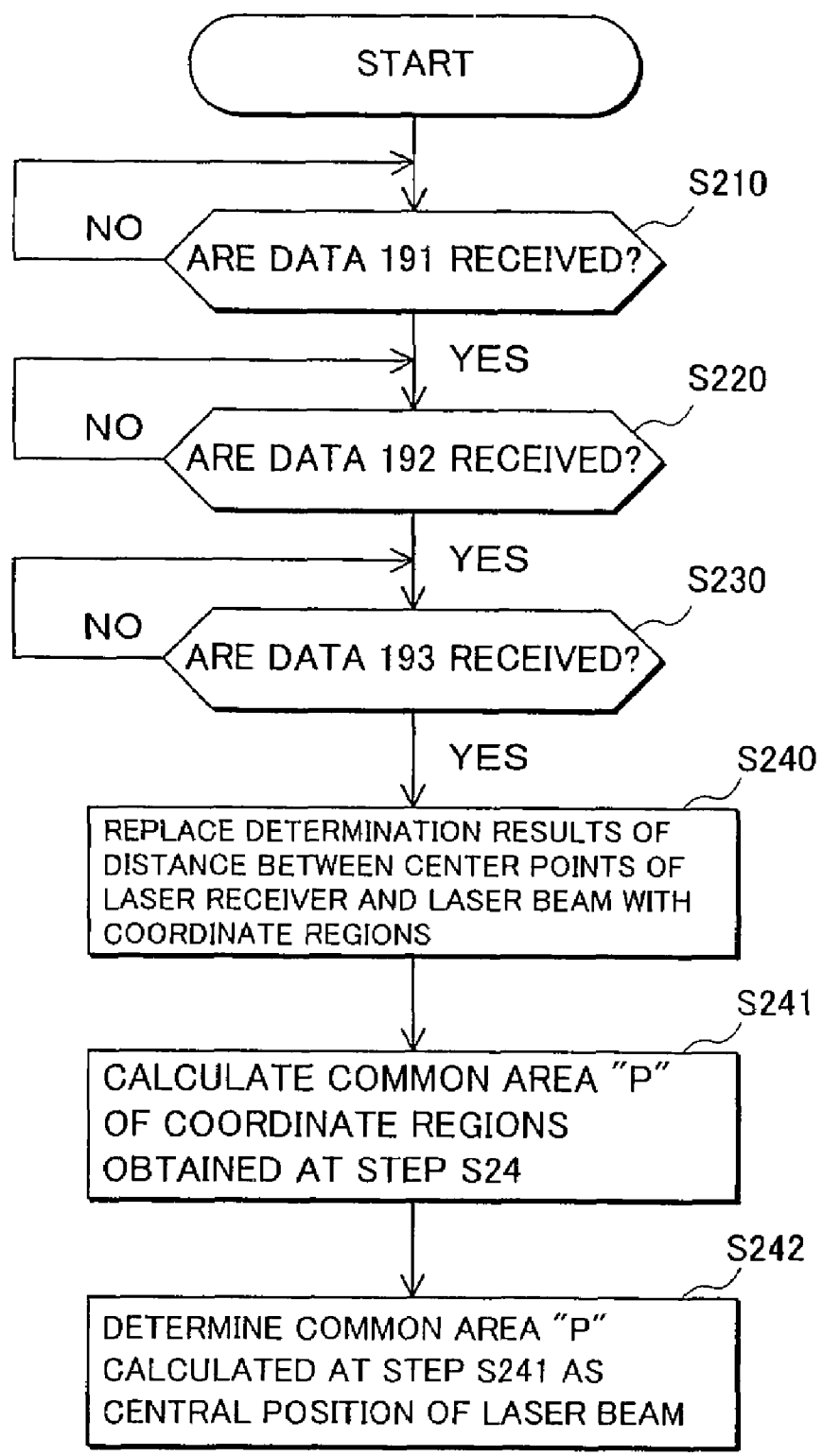
FIG. 19 is a flow chart showing a processing example (1) of an acceptance position determination of a controller in a laser receiving system according to the present invention.

Processing Example (1) of Acceptance Position Determination: FIGS. 18 and 19

As a processing example of an acceptance position determination of the laser beam by the acceptance position determining portion 70, a case in which an area "P" indicated by hatching in FIG. 18 is determined as the acceptance position of the laser beam based on the data 191-193 will now be described.

FIG. 18 shows a case where a common area is obtained when the determination results of the distance between center points in the laser receivers 41-43 are respectively found to be between 5.5 cm and 6 cm.

FIG. 19 is a flow chart showing a processing flow of such an acceptance position determination by the acceptance position determining portion 70.

Firstly, the acceptance position determining portion 70 determines whether or not the data 191-193 are received respectively at steps S210, S220 and S230. When all of the data 191-193 are received, the determination results of the distances between center points by the laser receivers 41-43 respectively are replaced with coordinate regions (at step S240). Subsequently, the common area "P" of the coordinate regions obtained at step S240 is calculated. Moreover, the common area "P" calculated at step S241 is detected as the center position of the laser beam.

Figure 20:
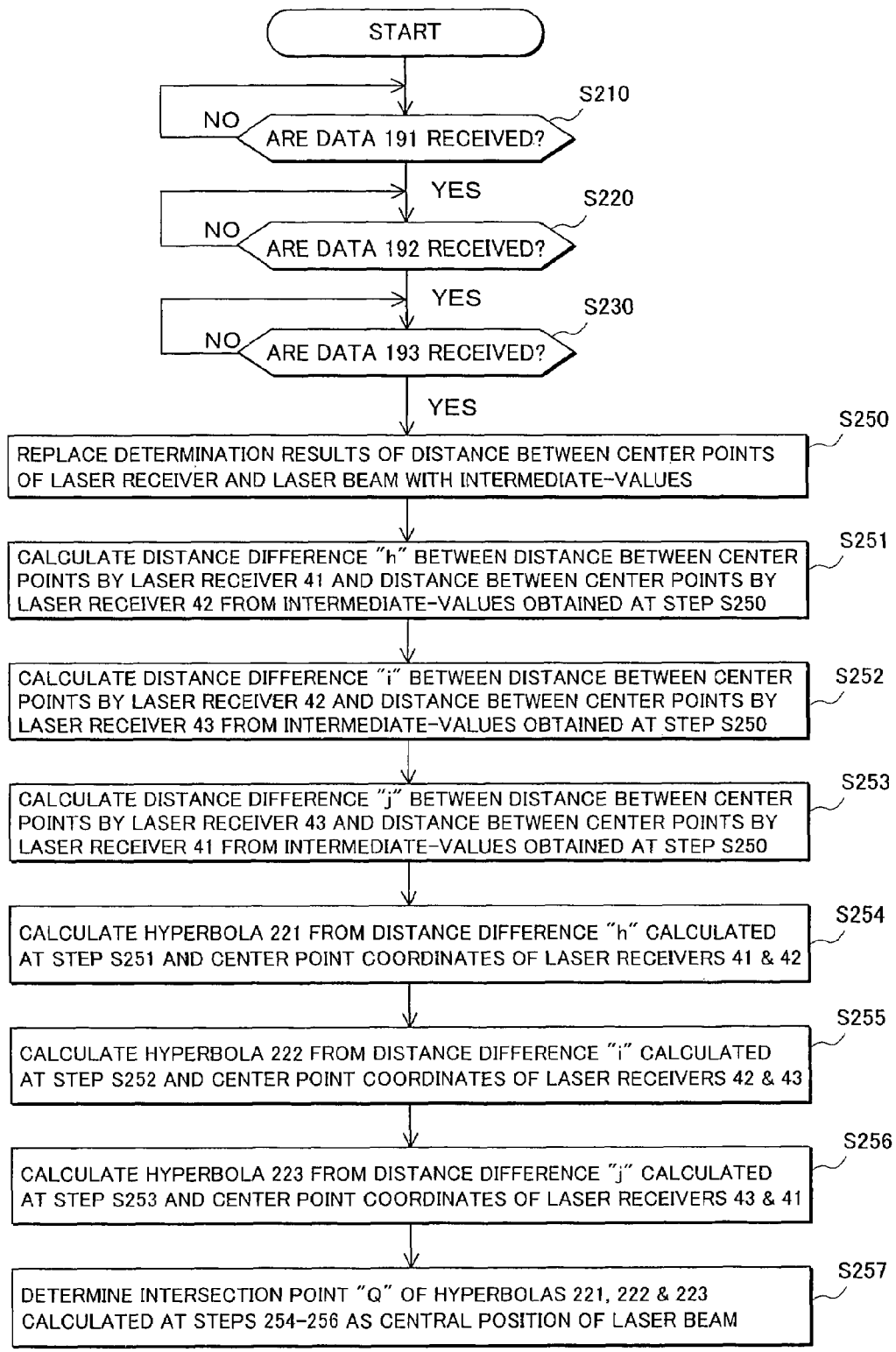
FIG. 20 is a flow chart showing a processing example (2) of an acceptance position determination of a controller in a laser receiving system according to the present invention.
Figure 21:
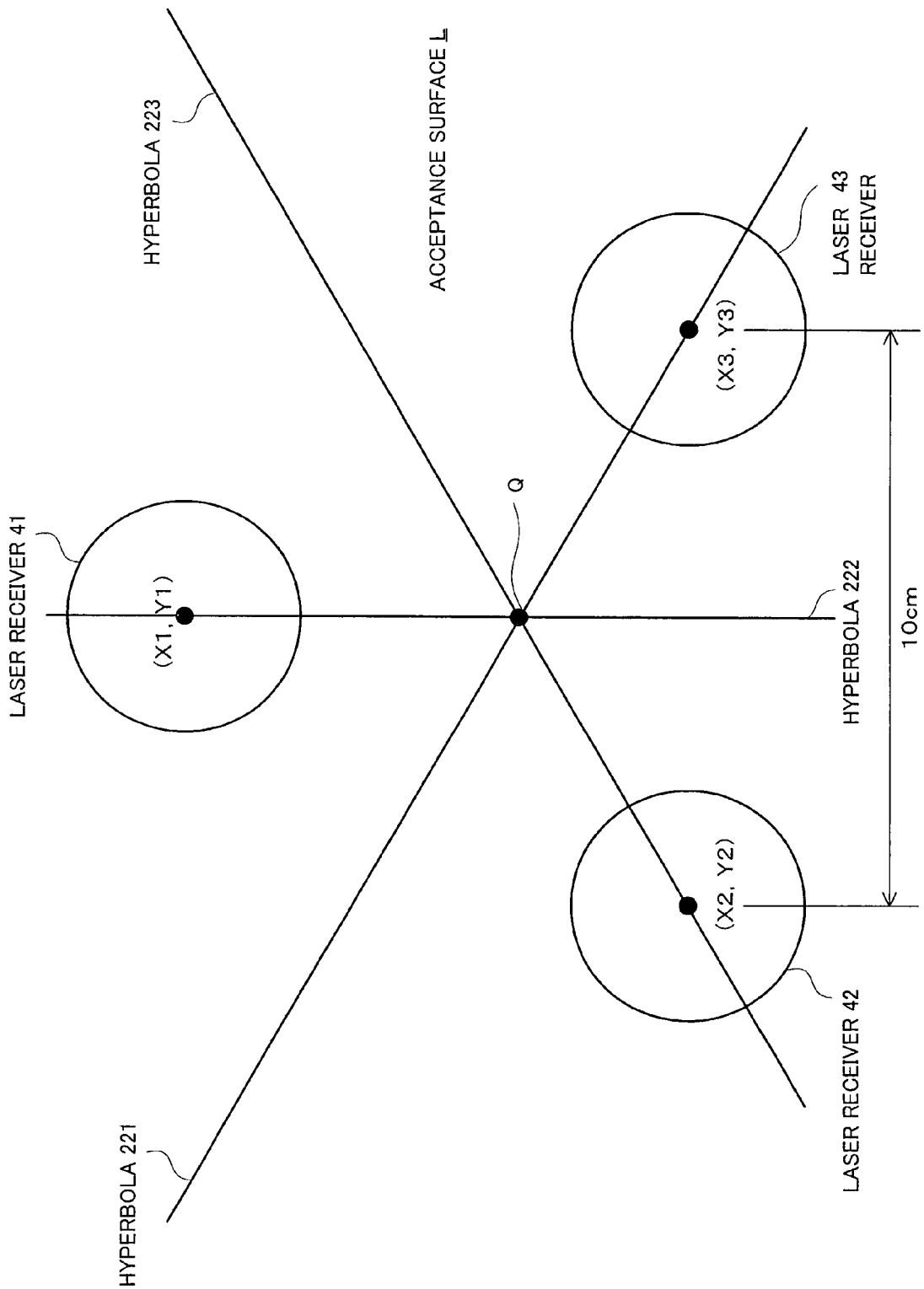
FIG. 21 is a diagram illustrating an example of the acceptance position determination of FIG. 20.

Processing Example (2) of Acceptance Position Determination: FIGS. 20 and 21

As another processing example of the acceptance position determination, there is a method in which the acceptance position is obtained by using hyperbolas from differences among distances between center points obtained by the laser receivers. FIG. 20 shows a processing flow of the acceptance position determining portion in this case.

In the same way as the case of FIG. 19, the acceptance position determining portion 70 determines whether or not data 191-193 are respectively received at steps S210-S230.

Subsequently, the determination results of the distances between center points by the laser receivers 41-43 are replaced with intermediate-values (at step S250).

At step S251, a distance difference "h" between the distance between center points by the laser receiver 41 and the distance between center points by the receiver 42 is calculated from the intermediate-values obtained at step S250.

At step S252, a distance difference "i" between the distance between center points by the laser receiver 42 and the distance between center points by the laser receiver 43 is calculated from the intermediate-values obtained at step S250.

At step S253, a distance difference "j" between the distance between center points by the laser receiver 43 and the distance between center points by the laser receiver 41 is calculated from the intermediate-values obtained at step S250.

At step S254, a hyperbola 221 is calculated from the distance difference "h", the center point coordinates (X1,Y1) of the laser receiver 41 and the center point coordinates (X2,Y2) of the laser receiver 42.

At step S255, a hyperbola 222 is calculated from the distance difference "i", the center point coordinates (X2,Y2) of the laser receiver 42 and the center point coordinates (X3,Y3) of the laser receiver 43.

At step S256, a hyperbola 223 is calculated from the distance difference "j", the center point coordinates (X3,Y3) of the laser receiver 43 and the center point coordinates (X1,Y1) of the laser receiver 41.

At step S257, an intersection point of the hyperbolas 221, 222, and 223 is calculated as the center position of the laser beam.

An example of determining the acceptance position of the laser beam according to the processing flow of FIG. 20 will be described referring to FIG. 21.

In FIG. 21, as in the case of FIG. 18, it is supposed that all of the laser receivers 41-43 determine that the distance between center points is 5.5 cm-6.0 cm. The determination results are transmitted to the acceptance position determining position 70 as the data 191, 192, and 193.

Since the determination results of the distance between center points determined by the laser receivers 41-43 are respectively replaced with the intermediate-values at step S250, all of the intermediate-values assume 5.75 cm that is between 5.5 cm and 6.0 cm.

Therefore, all of the distance differences "i", "j" and "k" respectively calculated at steps S251-S253 become 0 cm, so that the hyperbolas 221-223 calculated at steps S254-S256 become respectively straight lines as shown in FIG. 21.

Since the intersection point of the hyperbolas 221, 222 and 223 is calculated at step S257, and the intersection point is made the acceptance position of the laser beam, a point "Q" shown in FIG. 21 can be obtained as the acceptance position of the laser beam.

In an actual processing, there are cases where the intersection point of the two hyperbolas does not intersect with the remaining hyperbola. In such cases, a midpoint of the three intersection points is made the acceptance position of the laser beam.

Thus, by arranging three or more laser receivers according to the present invention on the acceptance surface, it is made possible to determine a position on the acceptance surface to which the laser beam has been transmitted.

Embodiment (3)

Embodiment of Laser Receiving System Used as a Target

Hereinafter it is supposed that the laser receiving system of the present invention is used as a target or with being attached to a human body, a car and like, and a laser beam transmitted by a laser transmitter simulant of a firearm or a laser transmitter attached to a firearm is received. An example of determining whether or not the laser beam simulant of a bullet hits the target by using the determination results of the distance between center points determined by the laser receivers composing the laser receiving system will now be described.

In this embodiment, a region (area) where the target is hit is also determined when the laser beam hits the target.

Figure 22A:
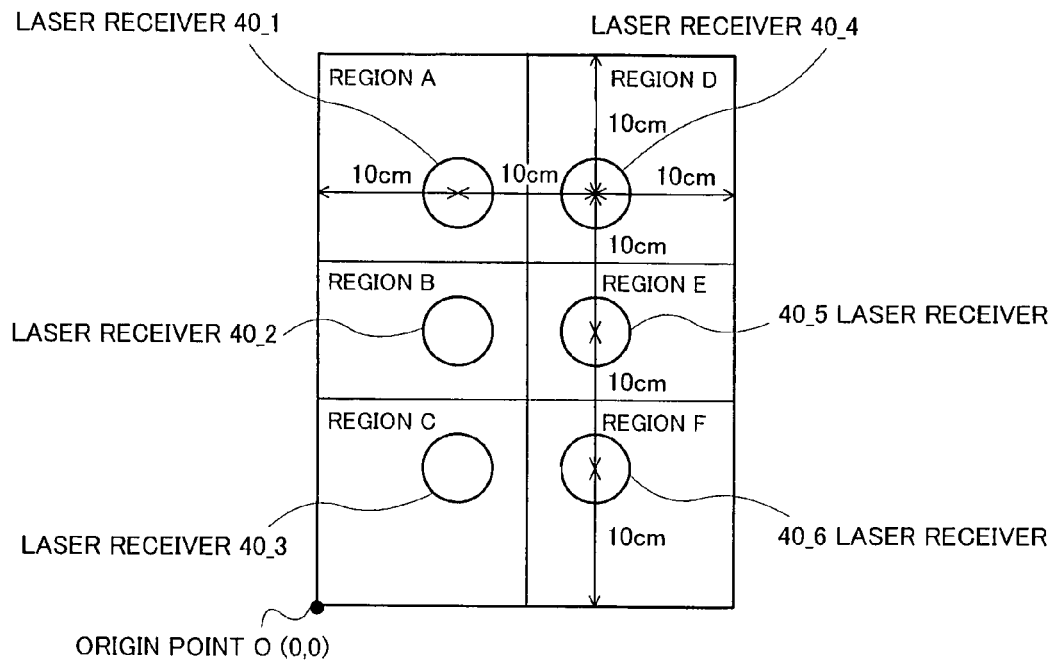
FIGS. 22A and 22B are diagrams illustrating embodiments (3) and (4) of a laser receiving system according to the present invention.
Figure 22B:
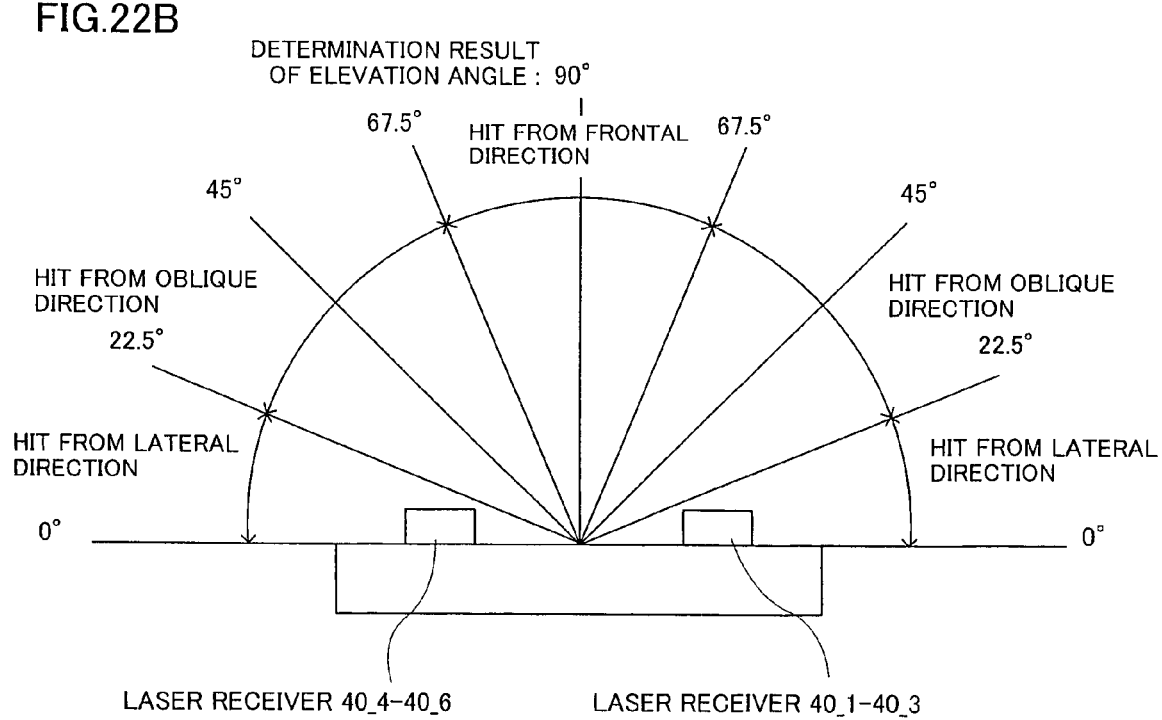

FIGS. 22A and 22B show a case where a laser receiving system composed of six laser receivers of the present invention is used as a target.

As shown in FIG. 22A, the six laser receivers 40_1-40_6 are arranged at intervals of 10 cm on the target. This target is a rectangular target that is 40 cm high by 30 cm wide and is divided into six regions "A"-"F".

A method for determining which region is hit by the center of the laser beam simulant of a bullet irradiated on the above-mentioned target will now be described.

Figure 23:
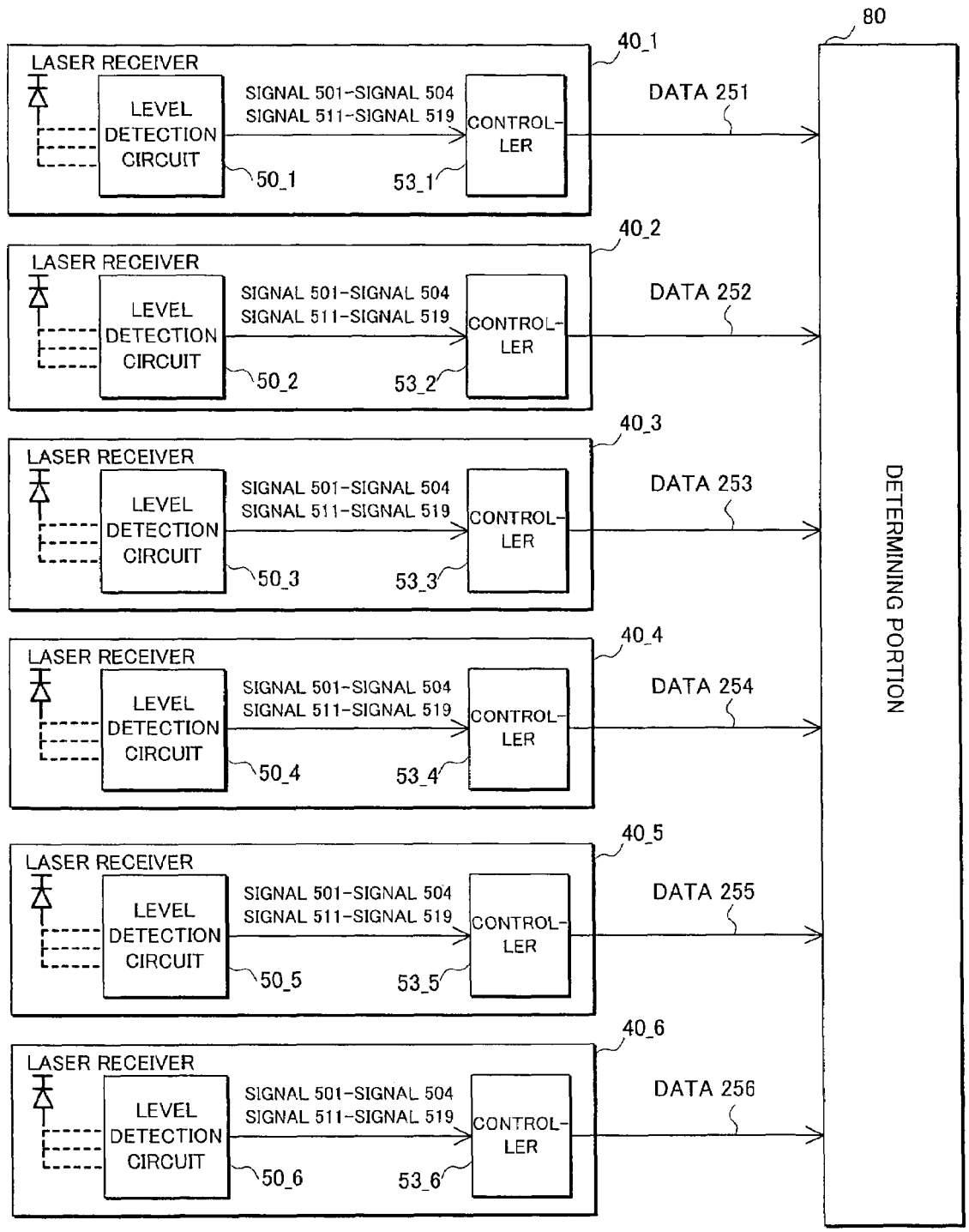
FIG. 23 is a functional block diagram showing embodiments (3) and (4) of a laser receiving system according to the present invention.

The laser receiving system used as the target is composed of the six laser receivers 40_1-40_6 and a determining portion 80 as shown in FIG. 23.

The controllers 53_1-53_6 of the laser receivers 40_1-40_6 determine the distance between center points by referring to the signals 501-504 and 511-519, and transmit the determination results to the determining portion 80 respectively as data 251-256, in the same way as the above-mentioned controller 53 of the laser receiver 40.

It is to be noted that the controllers 53_1-53_6 can be omitted from the laser receivers 40_1-40_6 by providing the determining portion 80 with the functions of the controllers 53_1-53_6 within the laser receivers 40_1-40_6

Also, it is supposed that the determining portion 80 preliminarily records the center point coordinates of the laser receivers 40_1-40_6. In this embodiment, since an origin point (0, 0) shown in FIG. 22A is made a reference, the center point coordinates of the laser receivers 40_1-40_6 are (10, 30), (10, 20), (10, 10), (20, 30), (20, 20) and (20, 10), respectively.

Figure 24:
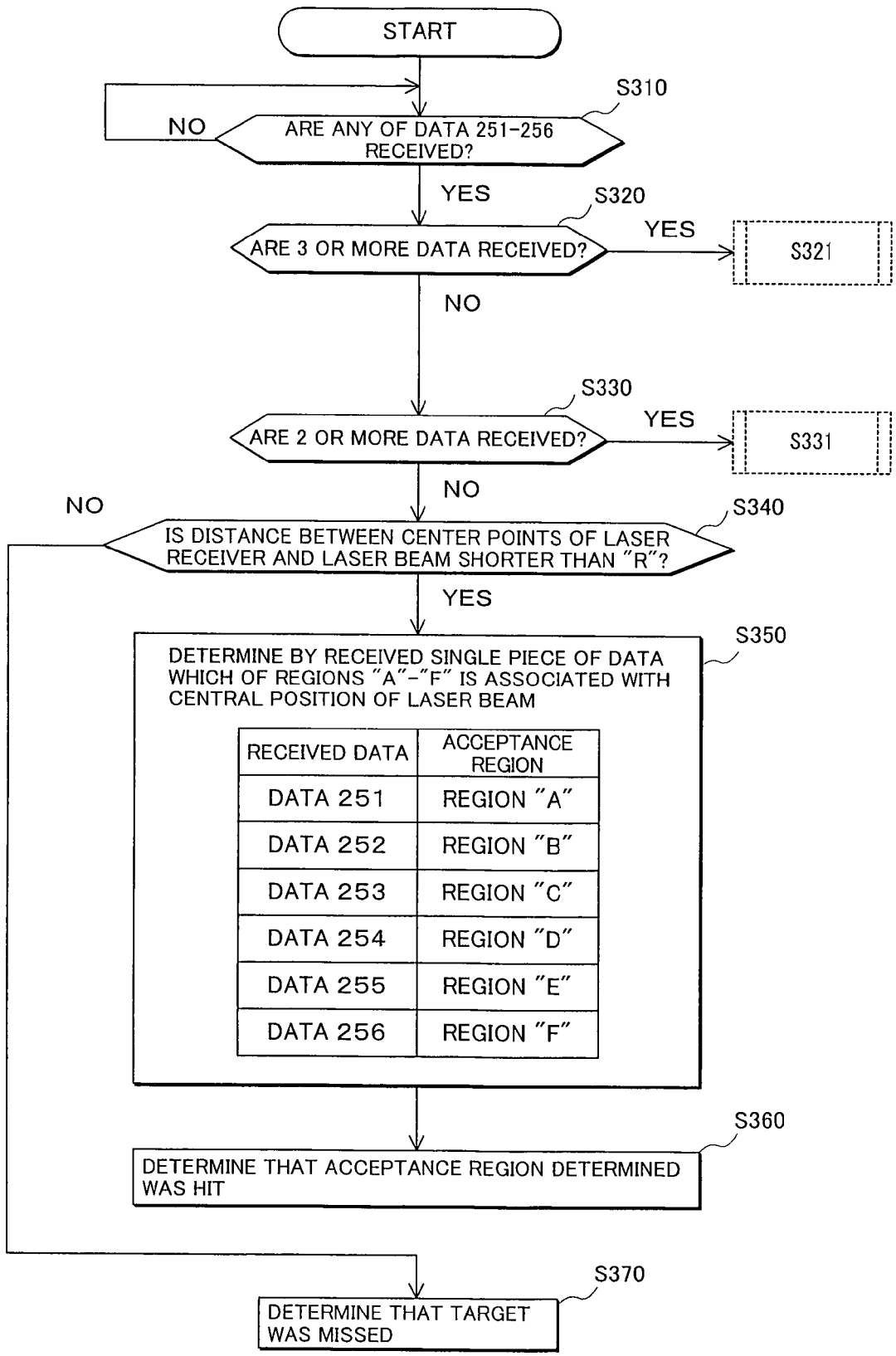
FIG. 24 is a flow chart showing an overall flow of acceptance region determination processing by a determining portion in the embodiment (3) of the laser receiving system according to the present invention.

Moreover, the determining portion 80 preliminarily records the regions "A"-"F" shown in FIG. 24 as following coordinate regions:

Coordinate region of region "A" is $0<X<15$ and $25<Y<40$.

Coordinate region of region "B" is $0<X<15$ and $15 \leq Y \leq 25$.

Coordinate region of region "C" is $0<X<15$ and $0<Y<15$.

Coordinate region of region "D" is $15 \leq X<30$ and $25<Y<40$.

Coordinate region of region "E" is $15 \leq X<30$ and $15 \leq Y \leq 25$.

Coordinate region of region "F" is $15 \leq X<30$ and $0<Y<15$.

Hereinafter, determination processing of the acceptance region by the determining portion will be described referring to FIGS. 24-28.

Determination of Acceptance Region (Overall Flow): FIG. 24

Firstly, FIG. 24 shows an overall processing flow of acceptance region determination.

When the processing is started, whether or not any of data 251-256 are received is determined at step S310, and the process proceeds to step S320 when the data are received.

At step S320, whether or not any three or more pieces of the data 251-256 are received is determined. When three or more pieces of data are received, the process proceeds to step S321 for determining the acceptance region by using the three pieces of data. If three or more pieces of data are not received, the process proceeds to step S330.

At step S330, whether or not two or more pieces of the data 251-256 are received is determined. If two or more data are received, the process proceeds to step S331 for determining the acceptance region using the two data. If two or more pieces of data are not received, the process proceeds to step S340.

At step S340, it is determined whether or not the distance between center points included in the received data is shorter than "R". If the determination result is shorter than "R", the process proceeds to step S350 while if it is equal to or longer than "R", the process proceeds to step S370.

It is to be noted that the value of "R" is supposed to be preset according to the size of the target (size of the acceptance surface on which the laser receivers are attached). In this embodiment it is set to approximately 10 cm.

Therefore, when the process proceeds to step S370, it is determined that the target is missed.

Step S350 is a process for determining the acceptance region when the received data are a single piece. Depending on which of the data 251-256 are received, which of the regions "A"-"F" shown in FIG. 22A is associated with the central position of the laser beam is determined as follows:

When only data 251 are received, the region "A" is determined.

When only data 252 are received, the region "B" is determined.

When only data 253 are received, the region "C" is determined.

When only data 254 are received, the region "D" is determined.

When only data 255 are received, the region "E" is determined.

When only data 256 are received, the region "F" is determined.

Figure 25:
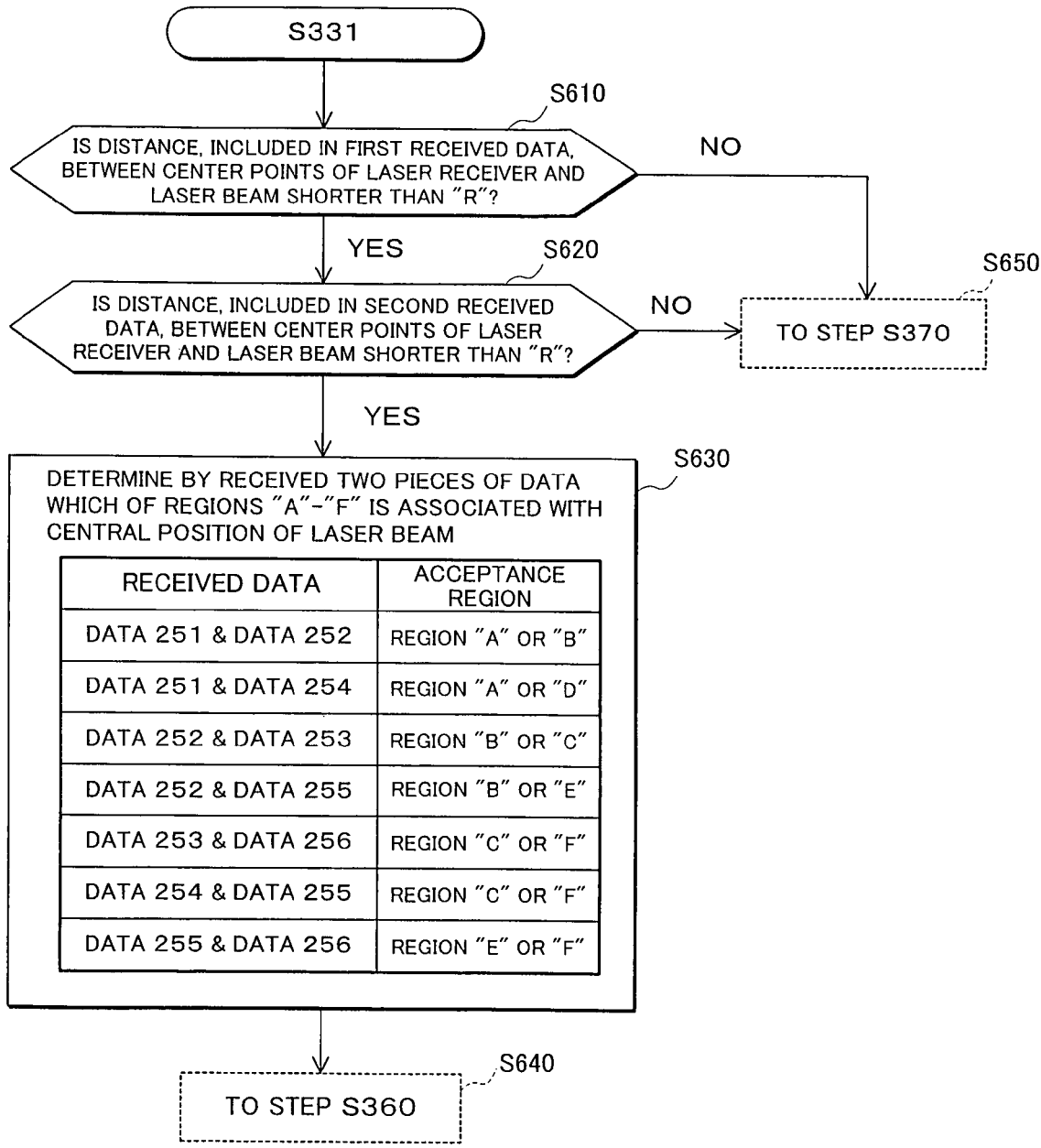
FIG. 25 is a flow chart showing an example of acceptance region determination processing using two pieces of data by the determining portion in the embodiment (3) of the laser receiving system according to the present invention.

Processing Example of Acceptance Region Determination Using Two Pieces to of Data: FIG. 25

Determination processing of the acceptance region using two pieces of data when the process proceeds from the above-mentioned step S330 to step S332 will now be described referring to FIG. 25.

Firstly, at step S610, it is determined whether or not the determination result of the distance between center points included in the first data received is shorter than "R". If it is shorter than "R", the process proceeds to step S620 while if it is equal to or longer than "R" the process proceeds to step S650.

At step S620, it is determined whether or not the determination result of the distance between center points included in the second data received is shorter than "R". If it is shorter than "R", the process proceeds to step S630 while if it is equal to or longer than "R" the process proceeds to step S650.

When the process proceeds to step S650 from the above-mentioned step S610 or S620, the process returns to step S370 of FIG. 24 so that it is determined that the target is missed.

At step S630, depending on which two pieces of the data 251-256 are the first and second data, which of the regions "A"-"F" is associated with the central position of the laser beam shown in FIG. 22 is determined as follows:

When data 251 and 252 are received, the region "A" or "B" is determined.

When data 251 and 254 are received, the region "A" or "D" is determined.

When data 252 and 253 are received, the region "B" or "C" is determined.

When data 252 and 255 are received, the region "B" or "E" is determined.

When data 253 and 256 are received, the region "C" or "F" is determined.

When data 254 and 255 are received, the region "D" or "E" is determined.

When data 255 and 256 are received, the region "E" or "F" is determined.

Figure 26:
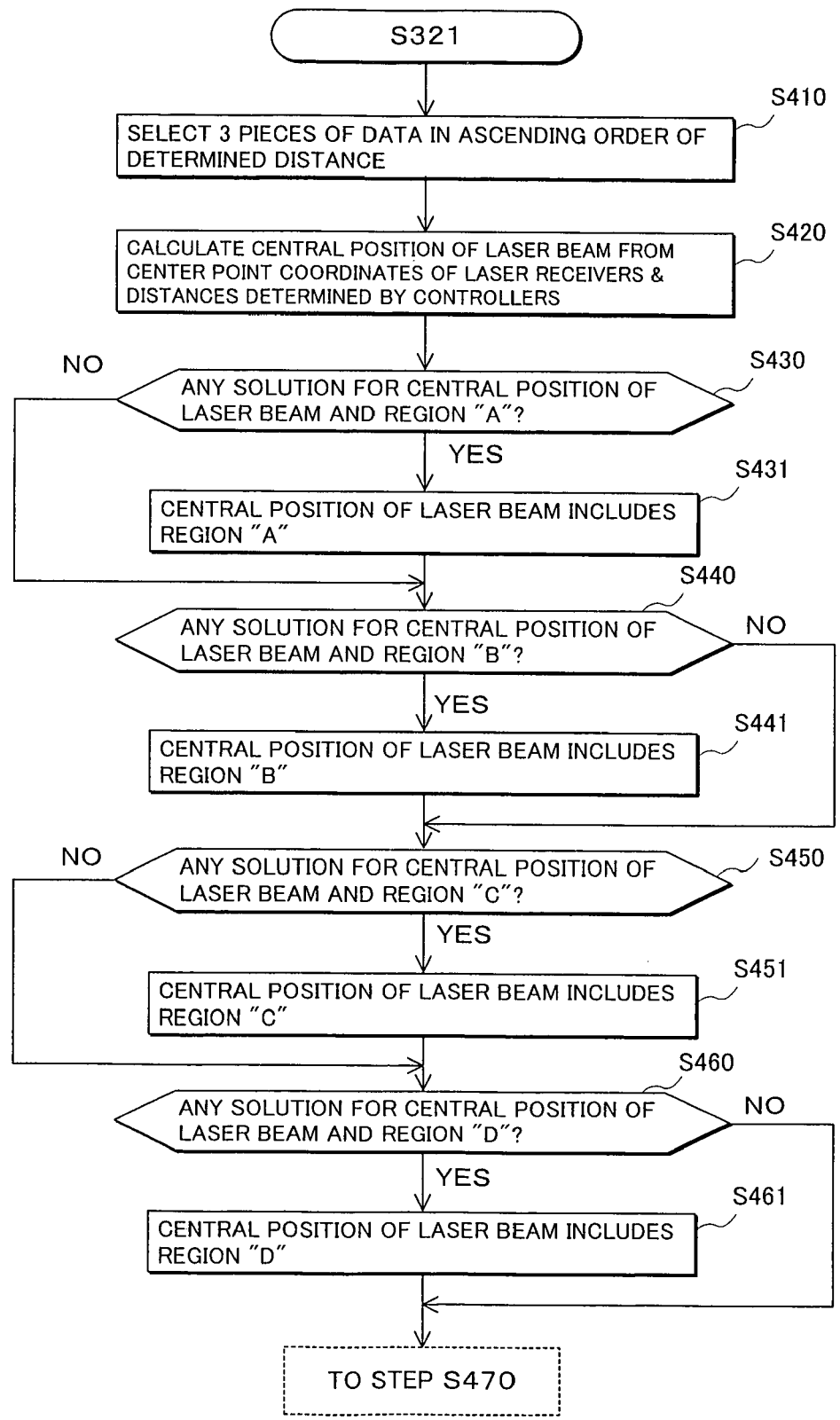
FIG. 26 is a flow chart showing a processing example (1) of an acceptance region determination using three pieces of data by the determining portion of the embodiment (3) of the laser receiving system according to the present invention.
Figure 27:
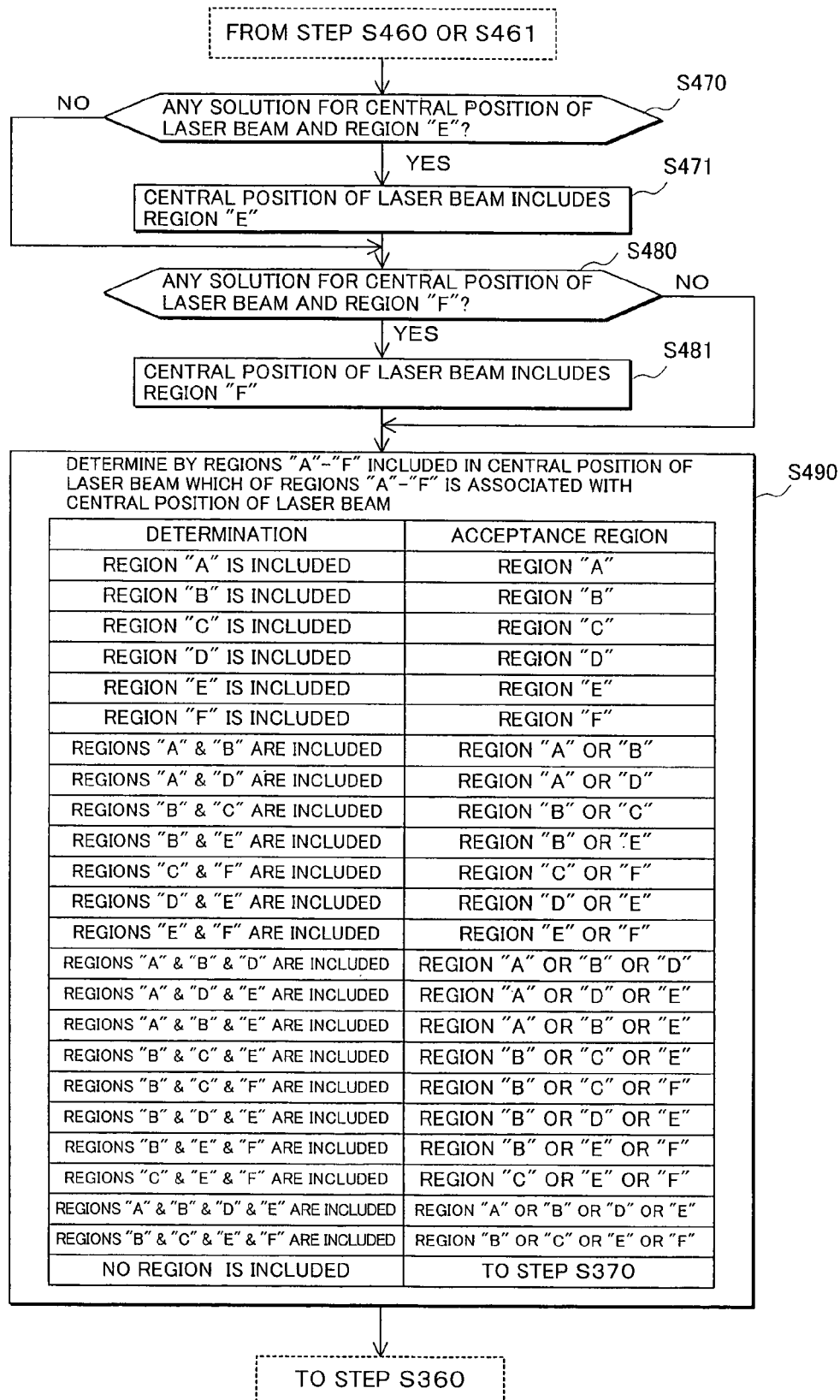
FIG. 27 is a flow chart showing a continuation of the determination processing example (1) shown in FIG. 26.

Processing Example (1) of Acceptance Region Determination Using Three Pieces of Data: FIGS. 26 and 27

An example of determination processing of acceptance region using more than three pieces of data when the process proceeds from the above-mentioned step S320 to step S321 will now be described referring to FIGS. 26 and 27.

Firstly, at step S410, three pieces of data in an ascending order of the distance between center points among more than three pieces of data are selected.

At step S420, the central position of the laser beam is calculated from the distance between center points obtained by the center point coordinates of the laser receivers and the three pieces of data. The central position of the laser beam in this case corresponds to the common area "P" obtained by the above-mentioned processing example (1) of the acceptance position determination. By using the central position of the laser beam thus calculated at step S420, determinations of steps S430, S440, S450, S460, S470 and S480 are performed as follows:

For example, at step S430, whether or not there is any solution for the central position of the laser beam and the region "A" is determined. It is to be noted that there is a solution for the central position of the laser beam and the region "A"" means that the central position of the laser beam (obtained as an area) and the region "A" have a common area. Namely, when "there is a solution for the central position of the laser beam and the region "A"", a part of the region "A" is included in the central position of the laser beam so that the process proceeds to step S431 to record that the central position of the laser beam includes the region "A". In case there is no solution, the process proceeds to step S440.

At steps S440, S450, S460, S470 and S480, in the same way as step S430, determinations are respectively performed with respect to the regions "B"-"F" so that when "there is a solution" in respective cases, the process proceeds to steps S441, S451, S461, S471 and S481 to record the regions "B"-"F" in the same way as the step S431.

When the process proceeds to step S490 from step S480 or S481, the process proceeds to step S360 (see FIG. 24) after determining the acceptance region depending on which of the regions "A"-"F" is included in the central position of the laser beam as follows:

When the central position of the laser beam includes the region "A", the acceptance region is determined to be the region "A".

When the central position of the laser beam includes the region "B", the acceptance region is determined to be the region "B".

When the central position of the laser beam includes the region "C", the acceptance region is determined to be the region "C".

When the central position of the laser beam includes the region "D", the acceptance region is determined to be the region "D".

When the central position of the laser beam includes the region "E", the acceptance region is determined to be the region "E".

When the central position of the laser beam includes the region "E", the acceptance region is determined to be the region "F".

When the central position of the laser beam includes the regions "A" and "B", the acceptance region is determined to be the region "A" or "B".

When the central position of the laser beam includes the regions "A" and "D", the acceptance region is determined to be the region "A" or "D".

When the central position of the laser beam includes the regions "B" and "C", the acceptance region is determined to be the region "B" or "C.".

When the central position of the laser beam includes the regions "B" and "E", the acceptance region is determined to be the region "B" or "E".

When the central position of the laser beam includes the regions "C" and "F", the acceptance region is determined to be the region "C" or "F".

When the central position of the laser beam includes the regions "D" and "E", the acceptance region is determined to be the region "D" or "E".

When the central position of the laser beam includes the regions "E" and "F", the acceptance region is determined to be the region "E" or "F".

When the central position of the laser beam includes the regions "A", "B" and "D", the acceptance region is determined to be the region "A", "B" or "D".

When the central position of the laser beam includes the regions "A", "D" and "E", the acceptance region is determined to be the region "A", "D" or "E".

When the central position of the laser beam includes the regions "A", "B" and "E", the acceptance region is determined to be the region "A", "B" or "E".

When the central position of the laser beam includes the regions "B", "C" and "E", the e acceptance region is determined to be the region "B", "C" or "E".

When the central position of the laser beam includes the regions "B", "C" and "F", the acceptance region is determined to be the region "B", "C" or "F".

When the central position of the laser beam includes the regions "B", "D" and "E", the acceptance region is determined to be the region "B", "D" or "E".

When the central position of the laser beam includes the regions "B", "E" and "F", the acceptance region is determined to be the region "B", "E" or "F".

When the central position of the laser beam includes the regions "C", "E" and "F", the acceptance region is determined to be the region "C", "E" or "F".

When the central position of the laser beam includes the regions "A", "B", "D" and "E", the acceptance region is determined to be the region "A", "B", "D" or "E".

When the central position of the laser beam includes the regions "B", "C", "E" and F, the acceptance region is determined to be the region "B", "C", "E" or "F".

It is to be noted that at the above-mentioned step S490, when the central position of the laser beam does not include any of the regions the process proceeds to step S370 (see FIG. 24) where it is determined that the target is missed.

Figure 28:
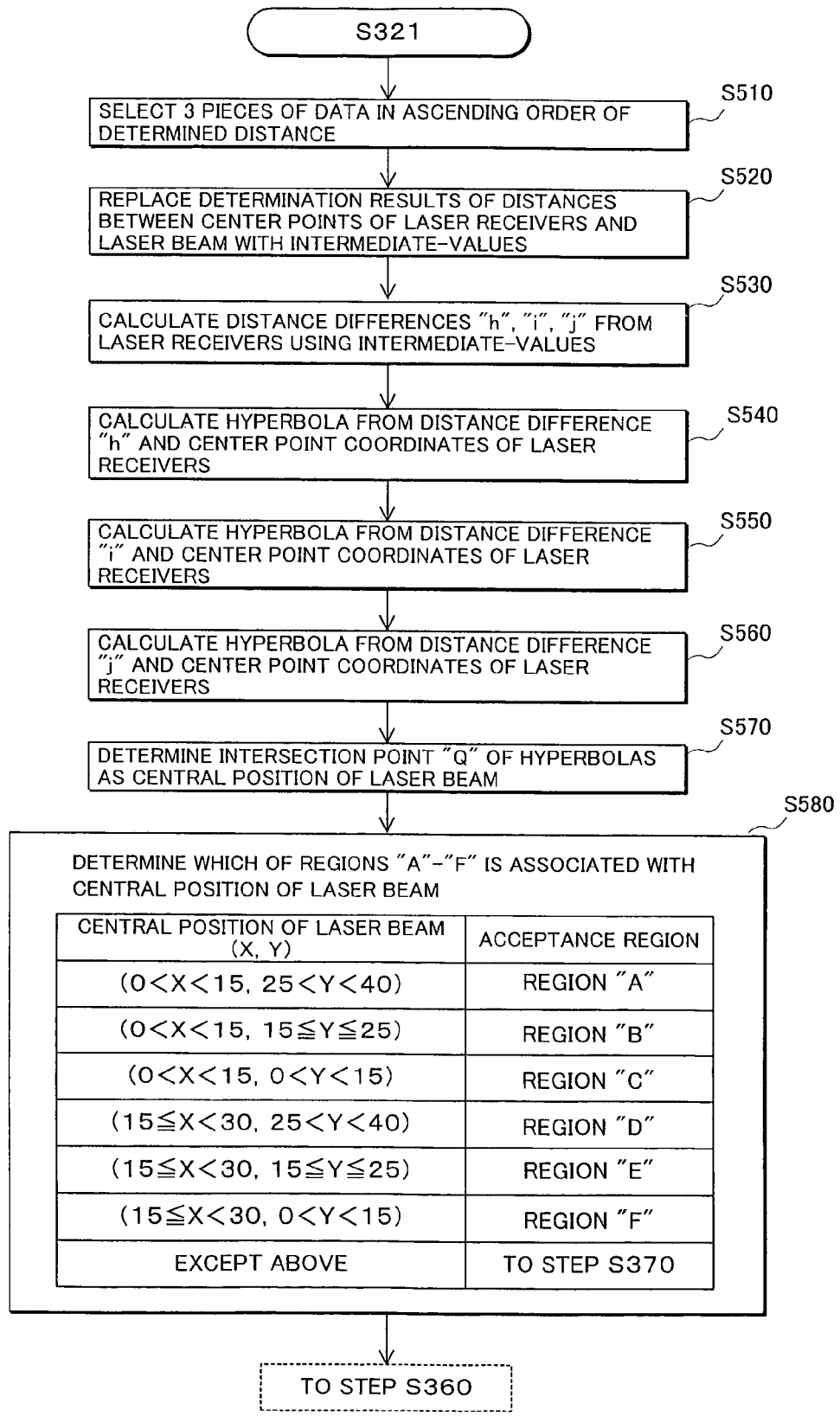
FIG. 28 is a flow chart showing processing example (2) of an acceptance region determination using three pieces of data by the determining portion of the embodiment (3) of the laser receiving system according to the present invention.
Figure 29:
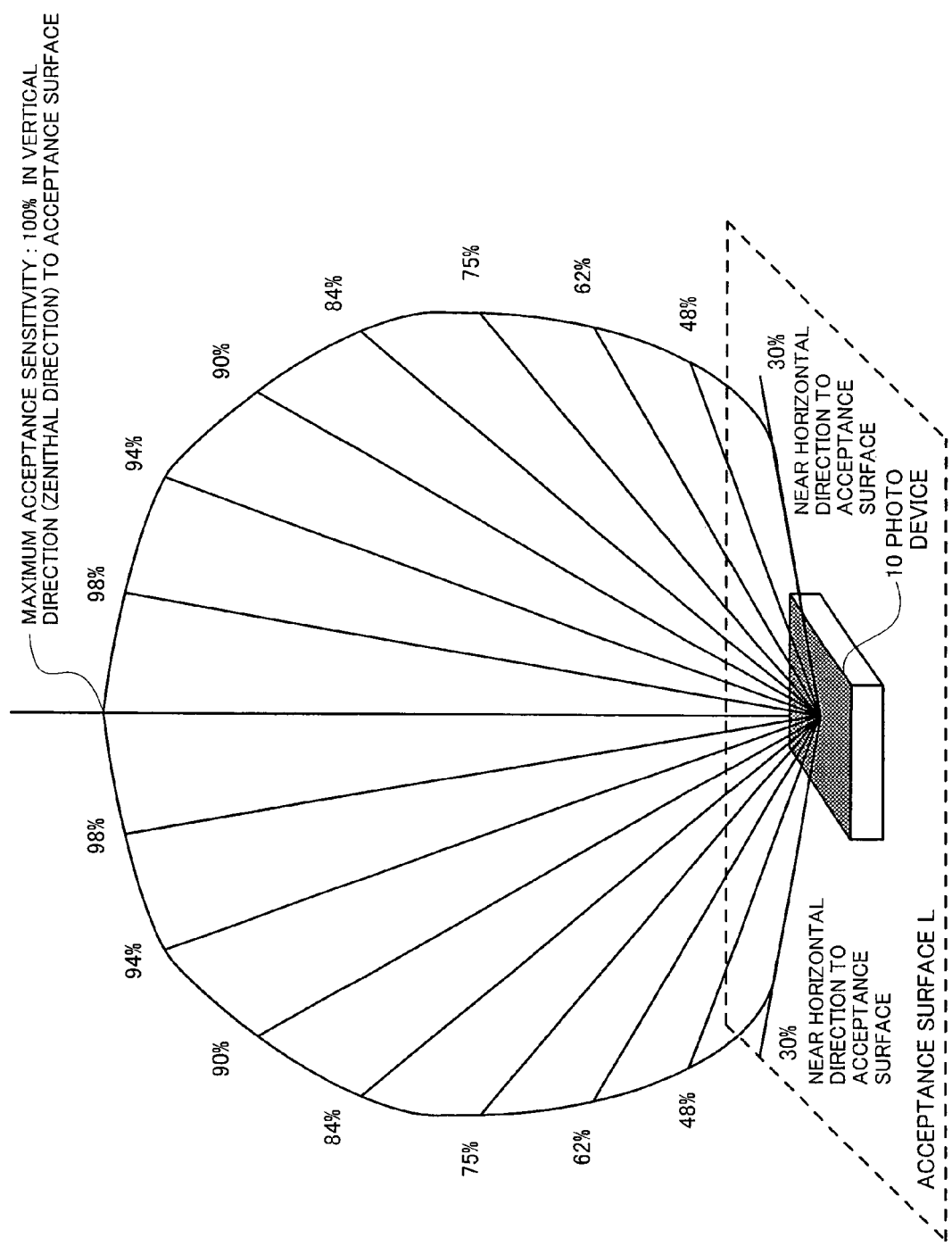
FIG. 29 is a diagram illustrating directivity of a general photo device.
Figure 30A:
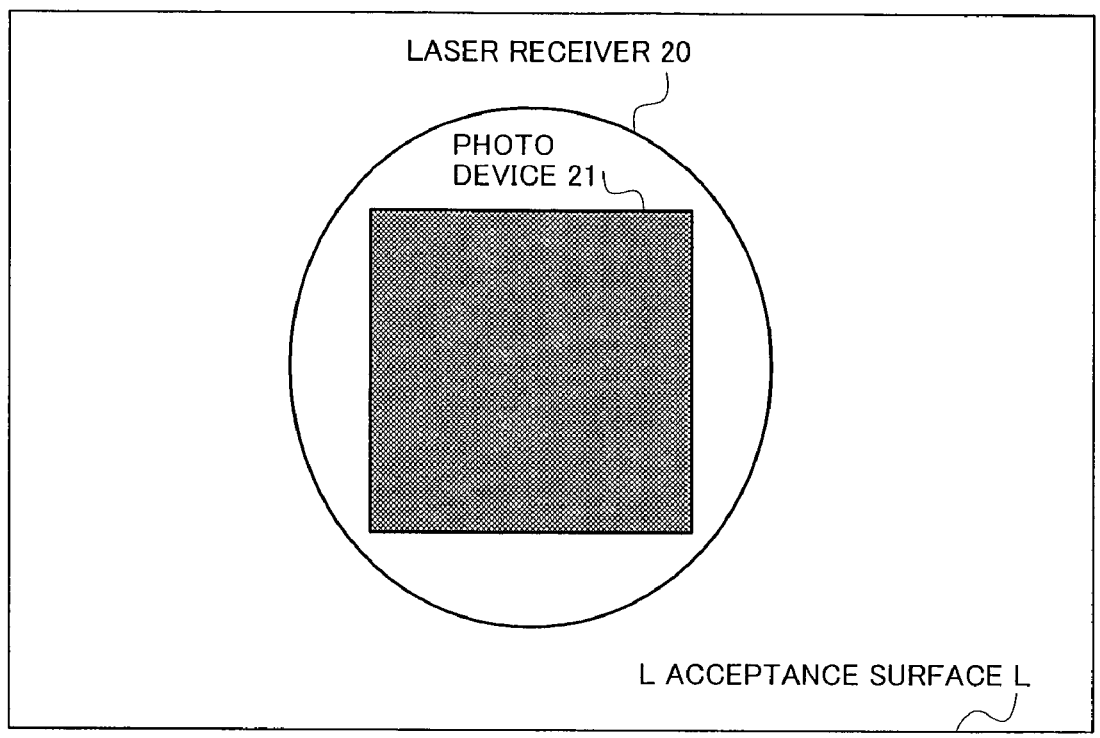
FIG. 30 is a diagram showing an arrangement of a photo device in a prior art laser receiver.
Figure 30B:
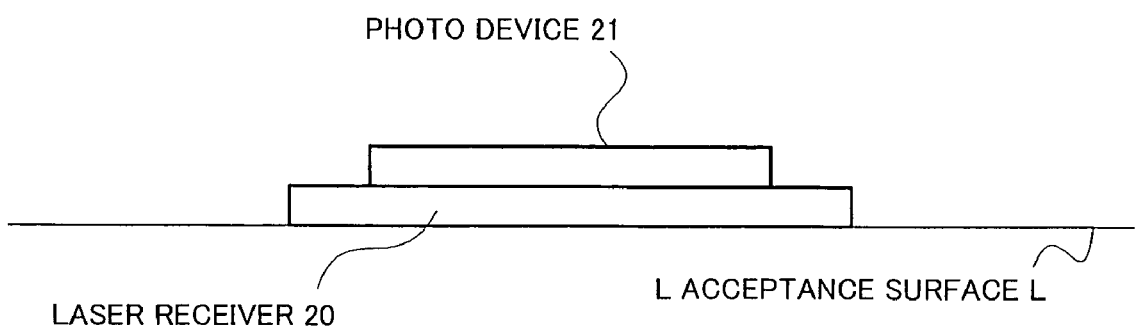
Figure 31:
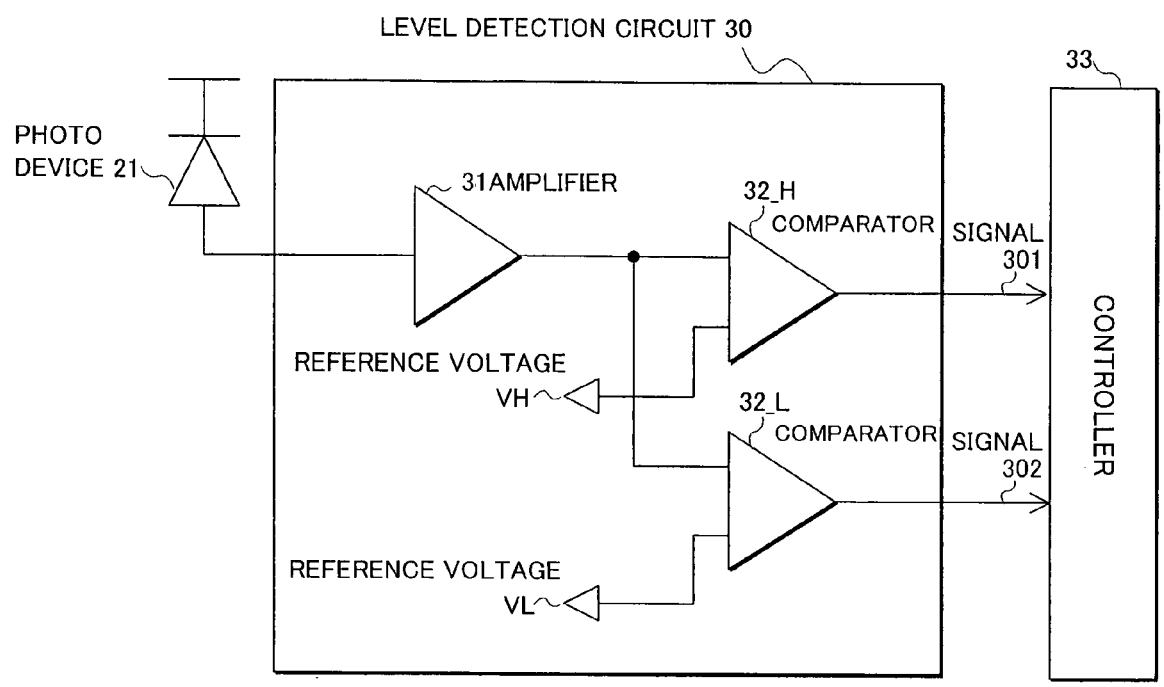
FIG. 31 is a functional block diagram of a prior art laser receiver.

Processing Example (2) of Acceptance Region Determination Using Three Pieces of Data: FIG. 28

Another processing example of the acceptance region determination using more than three pieces of data when the process proceeds to step S321 from the above-mentioned step S320 will now be described referring to FIG. 28.

Firstly at step S510, three pieces of data are selected in ascending order from among the three or more pieces of data.

At step S520, the determination results of the distance between center points determined by the laser receivers are replaced with intermediate-values.

At step S530, distance differences "h", "i" and "j" from the laser receivers are calculated using the replaced intermediate-values. It is to be noted that the process of this step S530 corresponds to the process of steps S251-S253 (see FIG. 20) of the above-mentioned processing example (2) of the acceptance position determination. Also, the steps S540, S550, S560 and S570 respectively correspond to steps S254-S257 (see FIG. 20) in the same way.

Since the central position of the laser beam calculated at step S570 is obtained as a point, which of the regions "A"-"F" is associated with the central position of the laser beam is determined as follows at step S580:

When 0<X<15 and 25<Y<40, the acceptance region "A" is determined.

When 0<X<15 and 15≦Y≦25, the acceptance region "B" is determined.

When 0<X<15 and 0<Y<15, the acceptance region "C" is determined.

When 15≦X<30 and 25<Y<40, the acceptance region "D" is determined.

When 15≦X<30 and 15≦Y≦25, the acceptance region "E" is determined.

When 15≦X<30 and 0<Y<15, the acceptance region "F" is determined.

After calculating the acceptance region at step S580 as described above, the process proceeds to step S360 (see FIG. 24). However, if none of the regions is included, the process proceeds to step S370 (see FIG. 24) where it is determined that the target is missed.

In this processing, the acceptance position can be calculated not only as the acceptance regions "A"-"F" but also as coordinates to be outputted or indicated.

Embodiment (4)

Embodiment of Laser Receiving System Determining Hit Direction Against Target: FIG. 22B A method for determining a direction from which the target is hit when the target shown in FIG. 22A receives a laser beam transmitted from a laser transmitter simulant of a firearm or a laser transmitter attached to a firearm will now be described.

FIG. 22B shows a side view of the target shown in FIG. 22A observed from the side where the regions "A" and "D" are mutually contacted. Namely, FIG. 22B is a plan view observed from upper side of a wall in case the target of FIG. 22A is attached to a vertical wall, for example.

Supposing a case where laser beams are irradiated from frontal direction, oblique direction and lateral direction as shown in FIG. 22B on such a target, a direction from which the laser beam is received (a hit direction) is determined.

The laser receiving system used in this case is supposed to have the arrangement shown in FIG. 23 in the same way as the above-mentioned embodiment (3), and the determining portion 80 is supposed to determine the hit direction. In this case the laser receivers 40_1-40_6 respectively perform acceptance elevation angle detection as described in the above-mentioned embodiment (1) to provide the results thereof as data 251-253 to the determining portion 80.

The determining criteria of the determining portion 80 based on the received data 251-253 can be prepared as follows:

When the number of determination results having the acceptance elevation angles of 90° and 67.5° is the highest, it is determined that the target is hit from the frontal direction.

When the number of determination results having the acceptance elevation angles of 45° and 22.5° is the highest, it is determined that the target is hit from the oblique direction.

When the number of determination results having the acceptance elevation angles of 0° is the highest, it is determined that the target is hit from the lateral direction.

It is to be noted that if all of the determination results for the data 251-253 are undeterminable, the hit direction is also undeterminable while if at least one piece of data is obtained the determination result of the data can be used for determining the hit direction.

While in the description of the above-mentioned embodiments (1)-(4), the laser receivers are supposed to have the arrangement shown in FIG. 2, digital signal processing may also be performed by using the laser receiver of the arrangement shown in FIG. 3, and by using the level data D610 and D620 of FIG. 3 instead of signals 501-504 and 511-519 of FIG. 2.

As described above, in a laser receiver according to the present invention, a plurality of photo devices are arranged on an acceptance surface so that acceptance angles of the laser beam thereof are mutually different and level detection means detect acceptance levels of the laser beam for the respective photo devices. Therefore, it is made possible to detect a distance between an acceptance position of a center point of a received laser beam on an acceptance surface and a center point of the laser receiver, and an elevation angle of the received laser beam from the acceptance surface by using the acceptance levels of the photo devices.

In this case, distance detection means respectively compare the acceptance levels of the photo devices detected by the level detection means with thresholds, so that it is made possible to detect a distance between the center point of the laser beam on the acceptance surface and the center point of the laser receiver itself by the combination of comparison results thereof.

Also, elevation angle detection means respectively compare the acceptance levels of the photo devices detected by the level detection means with thresholds, so that it is made possible to detect an elevation angle from the acceptance surface by combination of comparison results thereof.

What is claimed is:

1. A laser receiver receiving a laser beam from a laser transmitter comprising:
    a plurality of photo devices arranged on an acceptance flat surface and having different orientations so that acceptance angles of the laser beam thereof are mutually different;
    level detection means for detecting acceptance levels of the laser beam for the respective photo devices; and
    distance detection means for determining a center point of the laser beam on the acceptance flat surface based on a first logic value obtained from comparing the acceptance levels of the photo devices detected by the level detection means with thresholds, thereby determining a straight-line distance between the center point and a reference point preset on the acceptance flat surface.

2. The laser receiver as claimed in claim 1, wherein the first thresholds are settable to values corresponding to a beam pattern transmitted by the laser transmitter.

3. The laser receiver as claimed in claim 1, further comprising elevation angle detection means for determining an elevation angle of the laser transmitter with respect to a reference surface based on a second logic value obtained from comparing the acceptance levels of the photo devices detected by the level detection means with second thresholds.

4. The laser receiver as claimed in claim 3, wherein the second thresholds are settable to values corresponding to a beam patter transmitted by the laser transmitter.

5. The laser receiver as claimed in claim 1, wherein the distance detection means selects the first logic value depending on a material of the acceptance flat surface.

6. The laser receiver as claimed in claim 3, wherein the elevation angle detection means selects the second combination of the comparison results depending on a material of the acceptance flat surface.

7. A laser receiving system comprising:
 a plurality of laser receivers as claimed in claim 1 placed on a common acceptance flat surface; and
 acceptance position detection means for detecting an acceptance position of the laser beam respectively based on coordinates of the reference points of the laser receivers, and the distances determined by the laser receivers.

8. The laser receiver as claimed in claim 1, further comprising determination means for comparing the distance detected by the distance detection means with a predetermined threshold, and determining whether or not the laser beam simulating a bullet hits within a predetermined area.

9. The laser receiving system as claimed in claim 7, further comprising area determination means for determining an area on the acceptance flat surface hit by the laser beam simulating a bullet, based on the acceptance position of the laser beam detected by the acceptance position detection means.

10. A laser receiving system comprising:
 a plurality of laser receivers as claimed in claim 1 placed on the same acceptance flat surface;
 elevation angle detection means for respectively comparing the acceptance levels of the photo devices detected by the respective level detection means of the laser receivers with system thresholds, and determining an elevation angle of the laser transmitter from a reference surface on the acceptance flat surface by a logic value; and
 determination means for determining a direction from which the laser beam simulating a bullet has been transmitted based on the elevation angle from the reference surface detected by the elevation angle detection means.

11. A laser receiving system comprising:
 a plurality of laser receivers as claimed in claim 3 placed on the same acceptance flat surface; and
 determination means for determining a direction from which the laser beam simulating a bullet has been transmitted based on the elevation angles from the reference surface detected by the elevation angle detection means of the respective laser receivers.

12. The laser receiver as claimed in claim 1, wherein at least one of the photo devices is arranged so that an acceptance sensitivity thereof for the laser beam transmitted from a vertical direction with respect to the acceptance flat surface becomes maximum, and the other photo devices are arranged so that acceptance sensitivities thereof for the laser beam transmitted from a horizontal direction with respect to the acceptance flat surface become maximum.

13. A planar laser detector determining a source of a laser beam, comprising:
 photo devices on a flat surface including one photo device arranged parallel with the surface and having maximum acceptance when the laser beam propagates perpendicular to the surface, and a plurality of photo devices arranged perpendicular to the surface having different orientations to have maximum acceptance when the laser beam is received from different directions parallel with the surface; and
 a controller estimating distance to the surface of the laser beam and an angle of the laser beam relative to one photo device on the surface based on combinations of levels of light detected by the one photo device and the plurality of photo devices.

* * * * *